(12) United States Patent
Sawachi

(10) Patent No.: US 8,326,023 B2
(45) Date of Patent: Dec. 4, 2012

(54) PHOTOGRAPHING FIELD ANGLE CALCULATION APPARATUS

(75) Inventor: Yoichi Sawachi, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 1147 days.

(21) Appl. No.: 12/188,697

(22) Filed: Aug. 8, 2008

(65) Prior Publication Data

US 2009/0041338 A1      Feb. 12, 2009

(30) Foreign Application Priority Data

Aug. 9, 2007   (JP) ................. 2007-207692

(51) Int. Cl.
*G06K 9/00*      (2006.01)
*G06K 9/48*      (2006.01)
*H04N 7/18*      (2006.01)

(52) U.S. Cl. ......... 382/154; 382/199; 348/139; 348/159

(58) Field of Classification Search .................. 382/154, 382/199; 345/204, 418, 419, 424, 425, 428, 345/429
See application file for complete search history.

(56) References Cited

U.S. PATENT DOCUMENTS

| | | | | |
|---|---|---|---|---|
| 5,850,226 A | * | 12/1998 | Nagasawa et al. | 345/428 |
| 6,285,368 B1 | * | 9/2001 | Sudo | 345/419 |
| 6,912,490 B2 | * | 6/2005 | Dodge | 703/1 |
| 6,970,187 B1 | * | 11/2005 | Horimai et al. | 348/207.99 |
| 7,015,967 B1 | * | 3/2006 | Kochi et al. | 348/333.02 |
| 7,190,389 B1 | * | 3/2007 | Abe et al. | 348/42 |
| 7,555,157 B2 | * | 6/2009 | Davidson et al. | 382/154 |
| 7,933,512 B2 | * | 4/2011 | Campbell et al. | 396/325 |
| 7,936,384 B2 | * | 5/2011 | Sawachi | 348/240.1 |
| 8,049,658 B1 | * | 11/2011 | Lagonik et al. | 342/52 |
| 2002/0030675 A1 | * | 3/2002 | Kawai | 345/204 |
| 2003/0076413 A1 | * | 4/2003 | Kanade et al. | 348/139 |
| 2004/0070667 A1 | * | 4/2004 | Ando | 348/46 |

OTHER PUBLICATIONS

Woods et al, Image Distortions in Stereoscopic Video Systems (Stereoscopic Displays and Applications IV, Proceedings of the SPIE vol. 1915, San Jose, CA, Feb. 1993.).*

Anko Börner, 1996. The optimization of the stereo angle of CCD-line-scanners. In: International Archives of Photogrammetry and Remote Sensing, vol. XXXI, Part B1, pp. 26-30.*

Bares et al, Virtual 3D camera composition from frame constraints, ACM MultimediaACM (2000) , p. 177-186.*

* cited by examiner

*Primary Examiner* — Vu Le
*Assistant Examiner* — Andrae S Allison
(74) *Attorney, Agent, or Firm* — Sughrue Mion, PLLC

(57) ABSTRACT

A memory of a photographing field angle calculation apparatus has stored therein the position of each point captured by an imaging system as three coordinate values in horizontal, vertical, and depth directions when a photography space is photographed by the imaging system. A usage pixel value extraction means selects a plurality of points located in end portions in the horizontal direction of a range captured by the imaging system from those stored in the memory based on the vertical coordinate value, and extracts the horizontal and depth coordinate values of each of the selected points. A field angle calculation means calculates a horizontal photographing field angle when the photography space is photographed using the extracted horizontal and depth coordinate values.

14 Claims, 30 Drawing Sheets

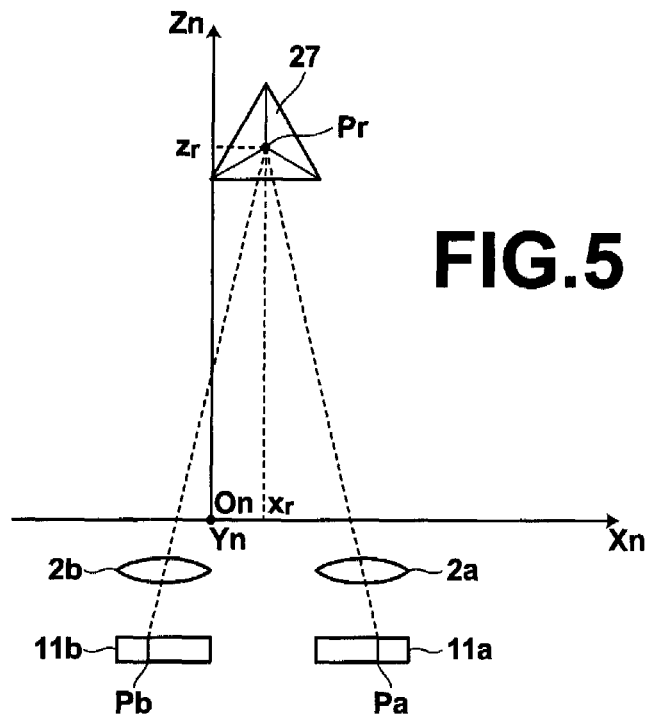
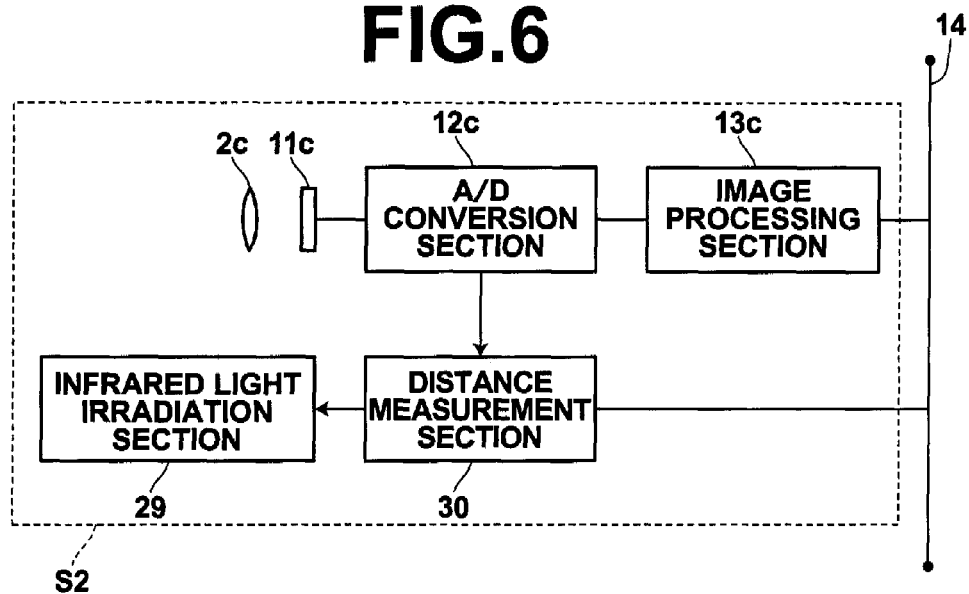

| 0 | 0, 0, 0 |
|---|---|
| 1 | $Ou_1$ DISPLACEMENT INFORMATION |
| 2 | $Ou_2$ DISPLACEMENT INFORMATION |
| 3 | $Ou_3$ DISPLACEMENT INFORMATION |
| 4 | $Ou_4$ DISPLACEMENT INFORMATION |
| 5 | $Ou_5$ DISPLACEMENT INFORMATION |
| 6 | $Ou_6$ DISPLACEMENT INFORMATION |
| 7 | $Ou_7$ DISPLACEMENT INFORMATION |
| 8 | 0, 0, 0 |
| 9 | 0, 0, 0 |
| 10 | 0, 0, 0 | h8

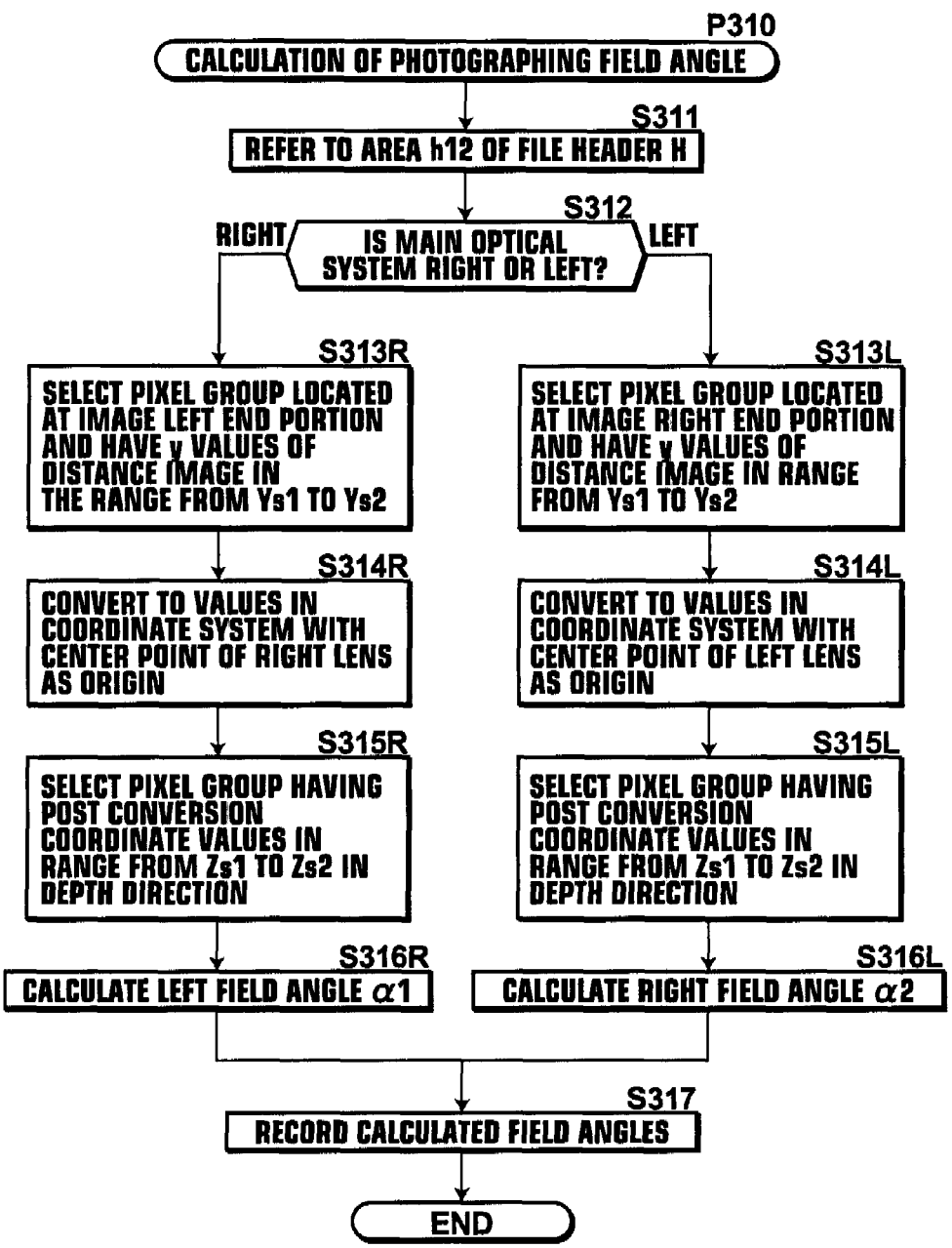

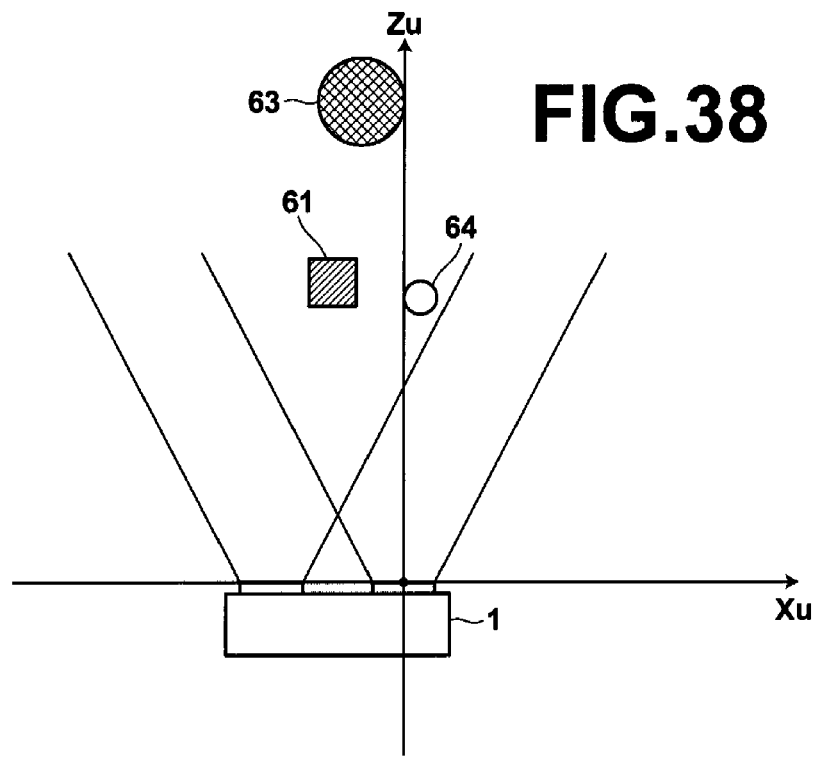
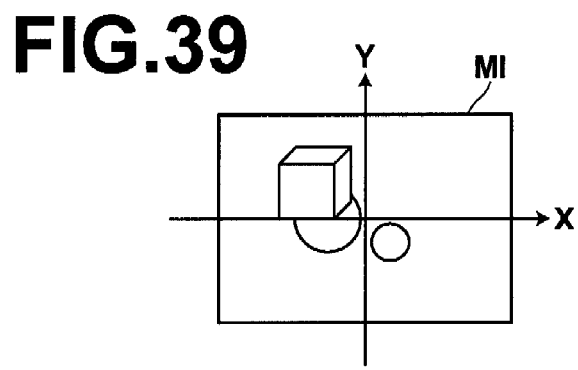

FIG.49

| HEADER H' |
|---|
| SYNTHETIC PARALLAX IMAGE (OVERALL) |
| SYNTHETIC PARALLAX IMAGE (DISPOSING AREA OF SUB-IMAGE (1) ONLY) |
| SYNTHETIC PARALLAX IMAGE (DISPOSING AREA OF SUB-IMAGE (2) ONLY) |
| ⋮ |
| SYNTHETIC PARALLAX IMAGE (DISPOSING AREA OF SUB-IMAGE (N) ONLY) |

PHOTOGRAPHING FIELD ANGLE CALCULATION APPARATUS

BACKGROUND OF THE INVENTION

1. Field of the Invention

The present invention relates to an apparatus for calculating a photographing field angle using three-dimensional information (distance image and the like) of photography space.

2. Description of the Related Art

In the field of computer vision, three-dimensional shape recognition of an object disposed in a photography space or depth recognition of the photography space is often practiced by optically measuring the positions of points visually recognizable when the photography space is observed from a certain direction. As for the measuring method, the following are known: stereo image method that employs principles of trigonometry, TOF (time of flight) method that measures a time from irradiation of light to receipt of reflected light, light section method that examines pattern light when slit light is irradiated, and the like.

An image produced by representing the positions of visually recognizable points as coordinates of a predetermined coordinate system and recording the coordinate values as pixel values is generally referred to as "distance image" or "depth image". The distance image includes spatial position information recognized by humans by observing a target with both eyes. In the mean time, RGB data or a gradation image obtained by ordinary photography includes color and brightness information recognized by a human when observing an object. Accordingly, combination of information obtained from the distance image and information obtained from the RGB data or the like may cause a computer to recognize information substantially identical to that obtained by human vision. This allows a stereoscopic image in a photography space to be reproduced on a monitor or to cause a computer to recognize a three-dimensional object.

Such technologies are useful in every industrial field and many studies have been carried out as described, for example, in U.S. Patent Application Publication No. 20020030675.

Image processing using a distance image may sometimes require photographing field angle information. For this purpose, it is often the case that, when a photograph operation is performed and a distance image is generated, the photographing field angle information is recorded in an image file with the distance image. In many cases, however, values recorded in image files are rounded to nominal values. Consequently, such values are not suitable for use with image processing that requires high accuracy. Therefore, it is an object of the present invention to provide an apparatus capable of accurately calculating a photographing field angle using a distance image where an approximate value is known but accuracy thereof is not sufficient.

SUMMARY OF THE INVENTION

The photographing field angle calculation apparatus of the present invention includes a memory for storing the position of each point captured by an imaging system as a set of horizontal, vertical, and depth coordinate values when a photography space is photographed by the imaging system, in addition to a usage pixel value extraction means and a field angle calculation means which will be described hereinbelow.

The usage pixel value extraction means selects a plurality of points located in end portions in the horizontal direction of a range captured by the imaging system from those stored in the memory based on the vertical coordinate value and extracts the horizontal and depth coordinate values of each of the selected points. Alternatively, the usage pixel value extraction means selects a plurality of points located in end portions in the vertical direction of a range captured by the imaging system from those stored in the memory based on the horizontal coordinate value and extracts the vertical and depth coordinate values of each of the selected points. Otherwise, the usage pixel value extraction means performs processing for both.

The field angle calculation means calculates a horizontal photographing field angle using the horizontal and depth coordinate values extracted from the memory by the usage pixel value extraction means. Alternatively, the field angle calculation means calculates a vertical photographing field angle using the vertical and depth coordinate values extracted from the memory by the usage pixel value extraction means. Otherwise, the field angle calculation means performs processing for both.

According to the configuration described above, an accurate value of photographing field angle may be obtained from the position information of each point captured by the imaging system. Thus, even where only an approximate value of photographing angle is known, high accurate control processing and image processing may be performed based on the accurate value of photographing field angle.

Preferably, the usage pixel value extraction means selects a point located in a vertical center portion of each end portion in the horizontal direction from those located in each end portion in the horizontal direction based on vertical position information of the points. Alternatively, the usage pixel value extraction means selects a point located in a horizontal center portion of each end portion in the vertical direction from those located in each end portion in the vertical direction based on horizontal position information of the points, and extracts the coordinate values with respect to the selected points. Otherwise, the usage pixel value extraction means performs processing for both. The use of values of pixels located only in the center portion where impact of lens distortion is small in the calculation allows the calculation accuracy of photographing field angle to be improved.

When the imaging system is a system that obtains a luminance image by one optical system and obtains the coordinate values by two optical systems including the one optical system, it is preferable that the usage pixel value extraction means is a means that estimates an overlapping range captured by the two optical systems based on the positional relationship between the one optical system and the other optical system, and performs the selection of a plurality of points only at end portions included in the range. Extraction of pixel values from the end portions only on a side where the depth coordinate values are accurate allows the calculation accuracy of photographing field angle to be improved.

Preferably, the usage pixel value extraction means sets a range in the depth direction in which a predetermined accuracy is ensured for depth coordinate values, and performs the extraction of coordinate values with respect to points within the set range. The "range in the depth direction in which a predetermined accuracy is ensured for depth coordinate values" is set based on a baseline length and approximate values of field angles of two optical systems constituting the imaging system. Alternatively, where the angle of convergence is likely to be a value other than 0 degree, it is set based on a baseline length, approximate values of field angles, and an angle of convergence of two optical systems constituting the imaging system. For example, it is set to a range obtained by adding a predetermined range offset value to an overlapping range captured by two optical systems constituting the imaging system. Preferably, the range offset value is determined with respect to each boundary of the range, that is, the boundary on the near side and the boundary on the remote side of the imaging system. Extraction of pixel values only from a range where the depth coordinate values are accurate allows the calculation accuracy of photographing field angle to be improved.

The field angle calculation means calculates the photographing field angle, for example, by performing calculations on pixel values extracted from the memory by the usage pixel value extraction means based on a formula below, $$\alpha = \arctan(\Sigma(xi/zi)/n)$$

where:

$\alpha$ is the photographing field angle; n is the number of selected pixels; i ranges from 1 to n; xi is a pixel value indicating the position of the pixel selected by $i^{th}$ selection in the horizontal or vertical direction; and zi is a pixel value indicating the position of the pixel selected by $i^{th}$ selection in the depth direction. Preferably, the value of the calculated photographing field angle is recorded in a predetermined memory, in a file in which the set of coordinate values are recorded, or in both of them. When calculation using the photographing field angle is required at a later time, the use of the recorded value allows reduction of overall calculation amount, and thereby the processing time may be reduced.

When recording the value of the calculated photographing field angle in the file, preferably, it is recorded in an area different from an area in which an approximate value of the field angle is recorded. This allows selective use between the approximate value and accurate value.

The present invention also provides a stereoscopic image editing apparatus and a stereoscopic image reproduction apparatus which include the photographing field angle calculation apparatus configured in the manner as described above as one of the components thereof. The stereoscopic image editing apparatus is an apparatus including the photographing field angle calculation apparatus configured in the manner as described above, and an editing means for editing a stereoscopic image using the value of the photographing field angle calculated by the field angle calculation means. The stereoscopic image reproduction apparatus is an apparatus including the photographing field angle calculation apparatus configured in the manner as described above, and a reproduction means for reproducing a stereoscopic image for display using the value of the photographing field angle calculated by the field angle calculation means.

BRIEF DESCRIPTION OF THE DRAWINGS

FIG. 5 illustrates an example of inherent coordinate system.

FIG. 6 illustrates an example of another configuration of a camera.

FIG. 32B is a flowchart illustrating another example of photographing field angle calculation process.

FIG. 38 illustrates an example of relationship among camera, photography space, and universal coordinate system when a main image is obtained.

FIG. 39 an example display where only a main image is displayed.

FIG. 49 illustrates a format of synthetic parallax image file.

DESCRIPTION OF THE PREFERRED EMBODIMENTS

Hereinafter, as an exemplary embodiment, a stereo camera having a photographing field angle calculation function will be described.

[Overview]

Figure 1A:
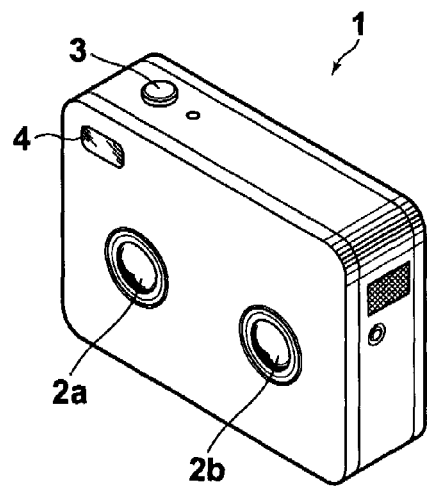
FIG. 1A is a perspective view (front side) of a stereo camera which is an embodiment of the photographing field angle calculation apparatus of the present invention.
Figure 1B:
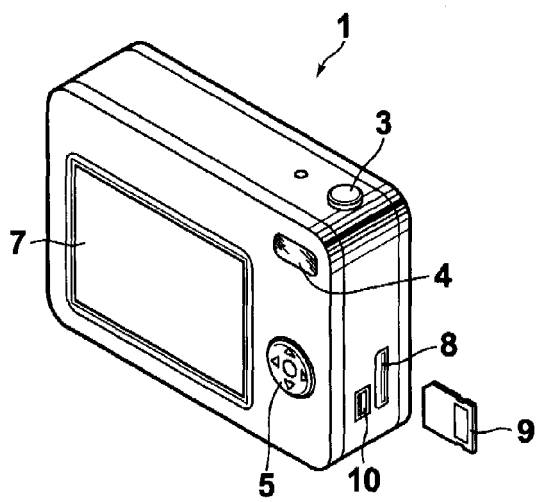
FIG. 1B is a perspective view (rear side) of a stereo camera which is an embodiment of the photographing field angle calculation apparatus of the present invention.

FIGS. 1A, 1B illustrate perspective views of the stereo camera, in which FIG. 1A illustrates a front external view and FIG. 1B illustrates a rear external view thereof. The stereo camera 1 is a camera of a type that measures the depth of a photography space by stereo method and includes two imaging lenses 2a, 2b. The stereo camera further includes a shutter release button 3, a viewfinder 4, an operation button 5, a liquid crystal monitor 7, a card slot 8 for accommodating a memory card 9, an external connection interface 10 for connecting a cable, a speaker, and a microphone, as in an ordinary digital camera.

Figure 2:
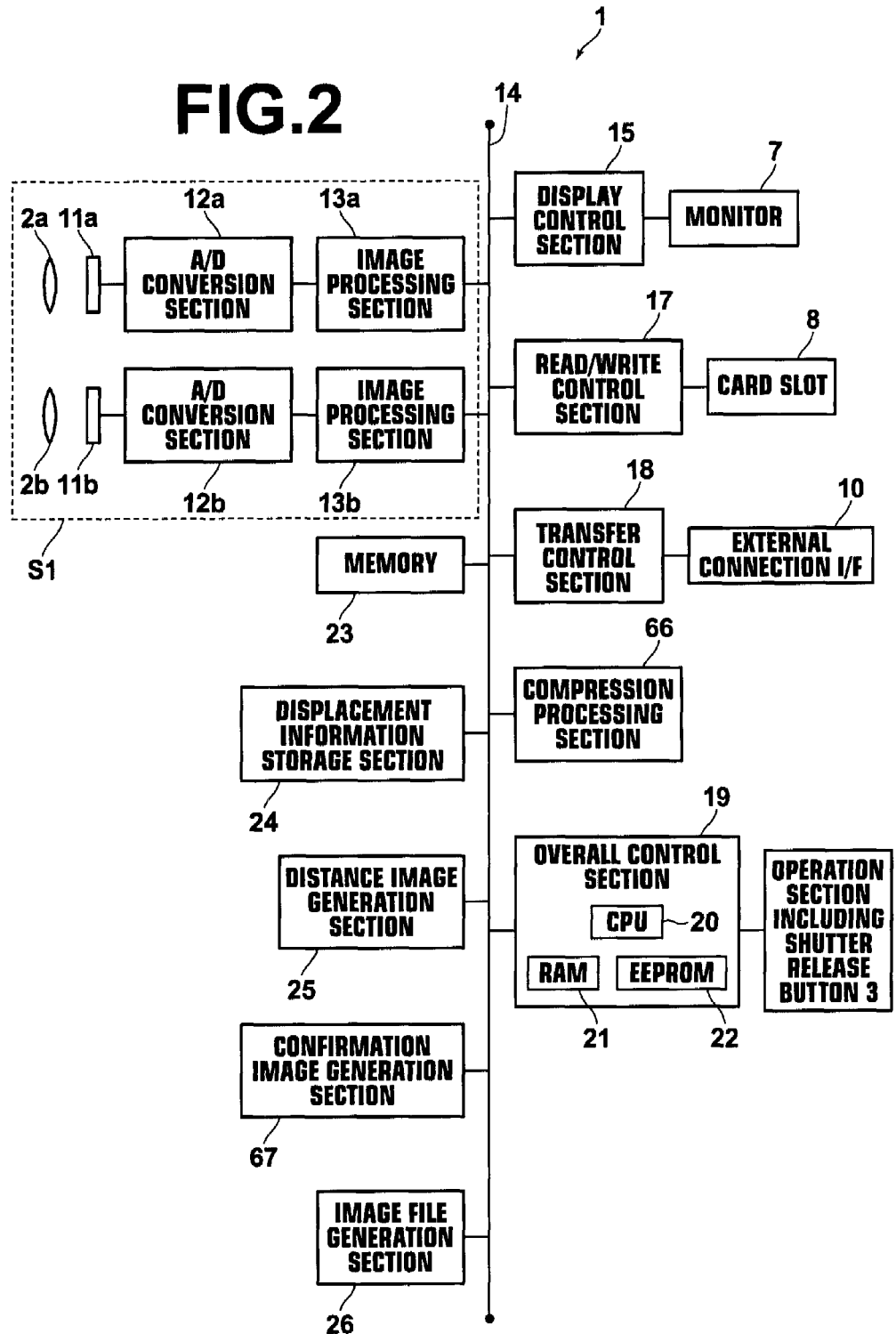
FIG. 2 is a block diagram of the stereo camera, illustrating an internal configuration thereof.

FIG. 2 is a block diagram of the stereo camera 1, illustrating an internal configuration thereof. As illustrated, the stereo camera 1 includes an imaging system having imaging lenses 2a, 2b, diaphragms (not shown), CCDs 11a, 11b, and mechanisms (not shown motor, control circuit and the like) for controlling lens position or orientation, open and close of the diaphragm, and charge output timing of the CCDs. The stereo camera 1 further includes A/D conversion sections 12a, 12b as a means for converting signals obtained by the imaging system to digital signals. The baseline length and angle of convergence of the imaging system are variable, by changing the position or orientation of the optical system, including the lenses 2a and 2b, by a motor.

The stereo camera 1 further includes a display control section 15 for controlling display output to the monitor 7, a read/write control section 17 for controlling data writing to the memory card 9 loaded in the card slot 8 and data reading therefrom, and a transfer control section 18 for performing input/output control with a device connected to the external connection interface 10. These control sections are implemented as dedicated circuits or as driver programs.

The stereo camera 1 further includes a memory 23, such as SDRAM, and an overall control section 19 for controlling overall operation of the camera 1. The overall control section 19 includes a RAM 21 which has recorded therein control programs, an EEPROM which has recorded therein various setting values used for control purposes, and a CPU 20 for executing the control program. The overall control section 19 is configured to receive input from the shutter release button 3 or operation button 5 and send an instruction signal to each section directly or through the system bus 14. In response to the instruction signal, each section performs processing while exchanging processed data by way of the memory 23.

Other sections connected to the system bus 14 are image processing sections 13a, 13b, a compression processing section 66, a displacement information storage section 24, a distance image generation section 25, a confirmation image generation section 67, and an image file generation section 26. The displacement information storage section 24 is implemented, for example, as an EEPROM. The image processing sections 13a, 13b, compression processing section 66, distance image generation section 25, confirmation image generation section 67, and image file generation section 26 are implemented as dedicated processors. However, the implementation method is not limited to this, and these sections may be implemented as a single processor having the functions of these sections or as one of the programs stored in the RAM 21 of the overall control section 19.

Hereinafter, an operation of the stereo camera 1 will be described focusing on processing performed by the image processing section 13a, 13b, displacement information storage section 24, distance image generation section 25, confirmation image generation section 67, and image file generation section 26.

[Photographing]

Figure 3:
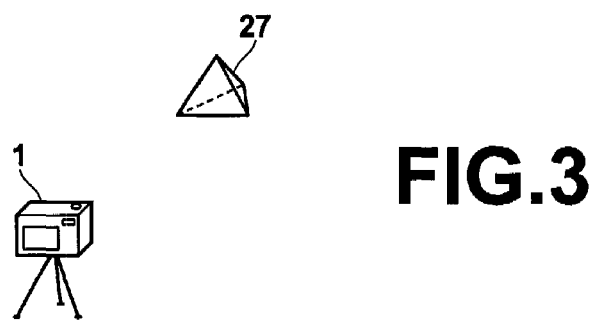
FIG. 3 illustrates an example of photography space.
Figure 4:
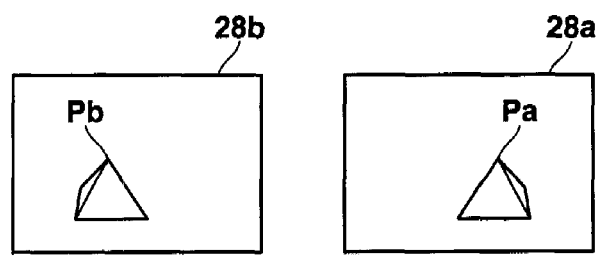
FIG. 4 illustrates an example of parallax image (RGB data).

When a photographing operation, such as depression of the shutter release button 3, is performed, the photographing operation is detected by the overall control section 19, and various instruction signals are sent to the imaging system from the overall control section 19. This causes picture signals representing a photography space to be outputted from the imaging system to the A/D conversion sections 12a, 12b, and image data (luminance images) are outputted from the A/D conversion sections 12a, 12b respectively. Here, it is assumed that RGB data are outputted. The image processing sections 13a, 13b store RGB data supplied from the A/D conversion sections 12a, 12b respectively in the memory 23. For example, where a photography space having a pyramid shaped object 27 disposed therein is photographed, as shown in FIG. 3, RGB data 28a obtained through the imaging lens 2a and RGB data 28b obtained through the imaging lens 2b like that shown in FIG. 4 are stored in the memory 23.

Then, the image processing sections 13a, 13b perform RGB-YCC conversion on the RGB data supplied from the A/D conversion sections 12a, 12b respectively, and then store YCC data obtained by the conversion in the memory 23. Thereafter, the YCC data are read out by the compression processing section 66, compressed thereby, and stored in the memory 23 again. This results in that the RGB data obtained through the imaging lens 2a, the RGB data obtained through the imaging lens 2b at the same time, and two sets of YCC data generated by converting and compressing these RGB data to be stored in the memory 23. Here, note that the RBG data may be directly compressed by the compression processing section 66 without performing the RGB-YCC conversion and stored in the memory 23. If that is the case, YCC data in the following description should be read as RBG data.

[Generation of Distance Image]

The distance image generation section 25 reads out the two sets of RGB data obtained at the same time through different lenses. Then, it performs pattern matching to relate pixels forming the two sets of RGB data to each other. For example, in the example shown in FIG. 4, the pixel Pa in the RGB data 28a is related to the pixel Pb in the RGB data 28b. Likewise, other pixels forming the RGB data 28a, 28b are related to each other.

Then, the distance image generation section 25 performs calculation based on stereo method (triangulation method) using information of the pixel correspondence, baseline length and angle of convergence of the imaging system to obtain spatial coordinate values of all points which may be captured by the camera in the photography space. This calculation is performed on a coordinate system which is inherent to the imaging system (inherent coordinate system), and the position of each point is represented as coordinate values in the inherent coordinate system. FIG. 5 shows an inherent coordinate system of orthogonal coordinate type disposed in the photography space shown in FIG. 3, with the left-right direction, up-down direction, and rear to front direction of the stereo camera 1 being taken as Xn axis, Yn axis (not shown), and Zn axis respectively. In the illustrated example, the origin of the inherent coordinate system is located at a position slightly displaced on the side of the imaging lens 2b from the center of the camera on the front side thereof. The position of the point Pr in the photography space represented by the pixel Pa in the RGB data 28a and the pixel Pb in the RGB data 28b is represented by (xr, yr, zr), although yr is not shown.

When coordinate values (x, y, z) of all of the points captured by the camera are obtained by repeating the calculation, the distance image generation section 25 records the coordinate values (x, y, z) obtained for each point as a distance image of the photography space. For example, each of the x, y, and z values of each point is recorded as 8 bit pixel data. Then, the generated distance image is stored in the memory 23, together with the RGB data and YCC data. Note that the distance image may be compressed by the compression processing section 66 like the YCC data.

The stereo camera 1 is a camera configured to obtain the positions of points recognizable when the photography space is viewed from one direction by stereo method, so that the pixel values of the distance image are coordinate values. On the other hand, in a camera using a method other than the stereo method, other values may be recorded as pixel values of a distance image. For example, a camera in which a configuration S1 of the portion enclosed by a broken line is replaced with a configuration S2 of the portion enclosed by a broken line in FIG. 6 is conceivable. The configuration S2 includes an imaging lens 2c, a CCD 11c, an A/D conversion section 12c, an image processing section 13c, an infrared light irradiation section 29, and a distance measurement section 30. In the configuration S2, amplitude modulated infrared light is irradiated onto a photography space by the infrared light irradiation section 29. The irradiation timing and amplitude modulation frequency are controlled by the distance measurement section 30. The irradiated infrared light is reflected at various locations within the photography space, and reflection light is received by the imaging lens 2c and CCD 11c. The A/D conversion section 12c supplies a signal representing the reflection light to the distance measurement section 30. The distance measurement section 30 calculates distances and orientations of all of the points which may be captured by the camera in the photography space based on the irradiation timing instructed to the infrared irradiation section 29, reception timing of the reflection light, and a phase difference between the irradiation light and reflection light (i.e., based on TOF method). That is, coordinate values where a polar coordinate system is defined in the photography space are obtained. In a camera including the configuration S2, a distance image is generated with coordinate values (r, θ, Φ) of the polar coordinate system as the pixel values by the distance image generation section 25.

Figure 7:
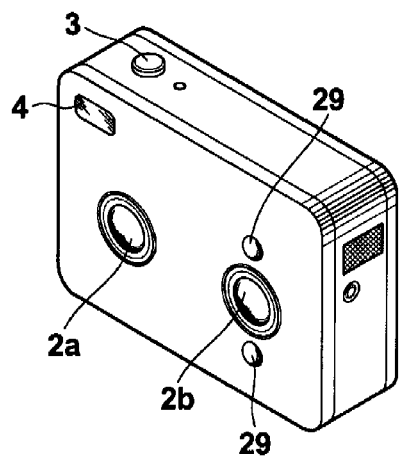
FIG. 7 illustrates an external view of a camera having another configuration.

As for the camera configuration, a camera including both the configuration S1 of FIG. 2 and the configuration S2 of FIG. 6 to allow selective use between stereo method and TOF method may also be conceivable, other than those described above. FIG. 7 illustrates an example external view of a camera having the two different configurations, configuration S1 and configuration S2. The imaging lens 2b shown in FIG. 7 serves as the imaging lens 2b shown in FIG. 2 as well as the imaging lens 2c shown in FIG. 6.

As described above, various configurations may be conceivable for a camera to be used for obtaining three-dimensional information of a photography space, and the type and accuracy of obtainable three-dimensional information are different depending on the method employed. But, any camera configuration or any type of values recorded as the pixel values of a distance image may be employed if it is capable of providing three-dimensional information with respect to a photography space.

[Image File Generation]

Figure 8:
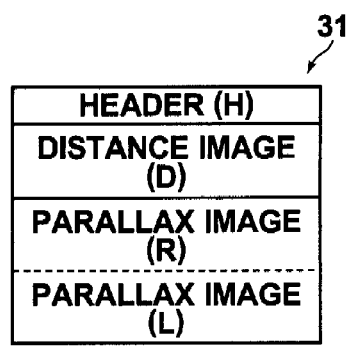
FIG. 8 illustrates an image file format.

Next, image file generation processing performed by the image file generation section 26 will be described. The image file generation section 26 generates a file formatted in the manner shown in FIG. 8, that is, an image file 31 that includes a file header H, a distance image D, a pair of YCC data (hereinafter, parallax images R, L). Information to be set in the file header is read out from each memory in the camera or supplied from each processing section in the camera. Otherwise, information selected or inputted by the user in a setting screen displayed on the monitor 7 is captured. The parallax images R, L and the distance image D are those stored in the memory 23 and read out therefrom.

In the illustrated example, the YCC data to be stored in the image file are assumed to be a pair of parallax images R, L, but an arrangement may be adopted in which only the YCC data generated from an image obtained through either one of the imaging lenses are stored. Where a camera having the structure described with reference to FIG. 6 is used, one set of YCC data will be stored in the image file, since the camera has only one imaging lens.

The image file generated by the image file generation section 26 is temporarily stored in the memory 23. The image file stored in the memory 23 is transferred to the read/write control section 17 and stored in a recording medium such as the memory card 9 via the card slot 8 under control of the overall control section 19. Alternatively, the image file is transferred to the transfer control section 18 and transferred to an external device via the external connection interface 10 also under control of the overall control section 19. Otherwise, the image file is transferred to the display control section 15 and displayed on the monitor 7 by the display control section 15.

The format of the image file 31 will now be described in detail. The image file 31 includes the file header H, distance image D, and parallax images R, L, as described above. The file header H includes information that indicates the position of the distance image and information that indicates the positions of the parallax images R, L within the file, in addition to file type and file size. Consequently, the distance image D and parallax images R, L may be read out by recognizing the format of the header information from the file type information recorded in a leading portion of the file and referring to offset information within the header information.

Figure 9A:
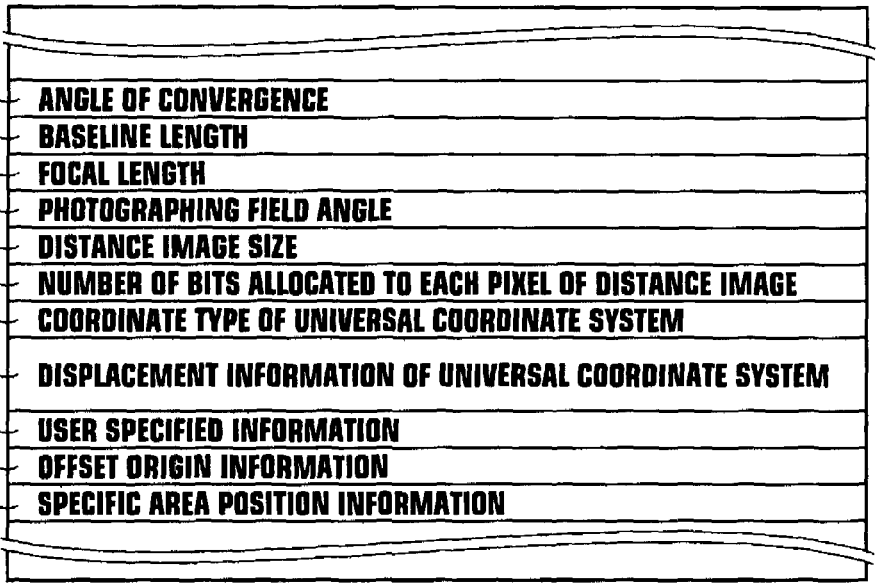
FIG. 9A illustrates an example file header of the image file.

As illustrated in FIG. 9A, the file header H also includes, as areas for setting information related to the distance image, an area h1 for setting the angle of convergence when an image is photographed, an area h2 for setting the baseline length, an area h3 for setting the focal length, an area h4 for setting the angle of view, an area h5 for setting the size (number of pixels in the vertical and horizontal directions) of the distance image, and an area h6 for setting the number of bits allocated to each pixel of the distance image. The area h3 is defined such that the focal length of each of the two imaging lenses can be set, in consideration of a camera having two imaging lenses like the stereo camera 1. The area h4 is defined such that the horizontal angle of view and vertical angle of view can be set with respect to each of the two imaging lenses.

The angle of convergence, baseline length, focal length, angle of view, size of distance image, and number of bits per pixel are inherent to the imaging system or determined when an adjustment is made to the imaging system. Whether they are inherent to the imaging system or adjustable depends on the specifications of the camera. For example, for a camera with fixed angle of convergence, the angle of convergence is an inherent value, and for a camera with adjustable angle of convergence, the angle of convergence is a variable value. Values inherent to the imaging system are recorded in a predetermined area of a predetermined memory (EEPROM 22 of the overall control section 19, memory 23, or another not shown memory) within the stereo camera 1. A value to be determined by adjustment is stored in a predetermined memory when the adjustment is completed by the control section performed the adjustment (if, for example, it is the angle of convergence, a circuit controlling the orientation of the lens). Note that the values stored in the memory at this stage are discrete values (rough values) serving as a measure of each setting value, and not necessarily accurate values. The image file generation section 26 reads out the values stored in the memory in the manner as described above and sets the readout values to the respective areas h1 to h6.

The file header H further includes, as areas for setting information related to the distance image, an area h7 for setting the type of a universal coordinate system (orthogonal coordinate system or polar coordinate system), an area h8 for setting displacement information of the universal coordinate system, an area h9 for setting a universal coordinate system specified by the user, an area h10 for setting an offset origin specified by the user, and an area h11 for setting position information of a specific area to be described later.

Figure 9B:
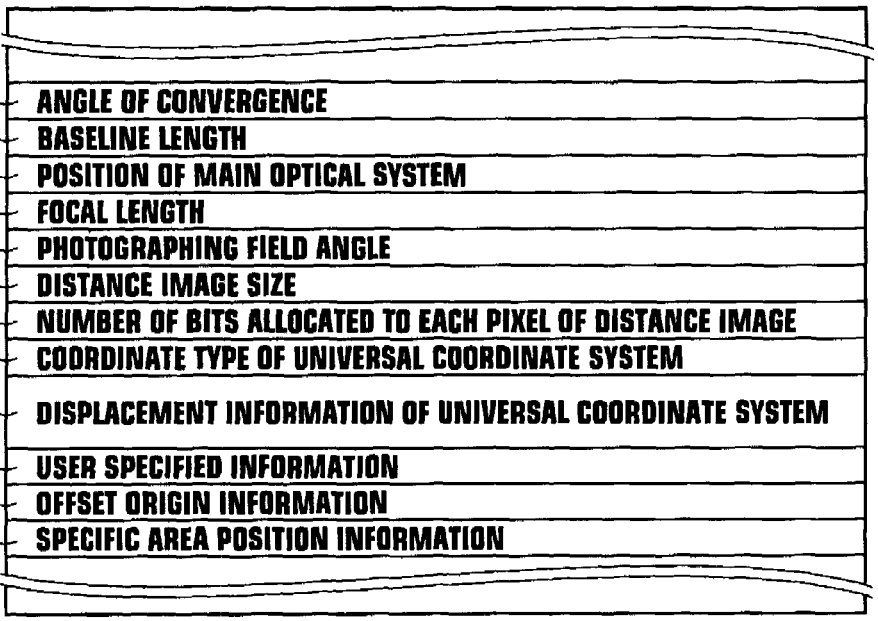
FIG. 9B illustrates another example file header of the image file.

In a stereo camera of the type in which only the YCC data generated from an image obtained through either one of the imaging lenses 2a, 2b are stored in the file, additional information is further stored in the file header H, which identifies whether the YCC data stored in the file are those generated by the right optical system including the imaging lens 2a or those generated by the left optical system including the imaging lens 2b. Here, the optical system contributed in the generation of the YCC data is referred to as the main optical system. FIG. 9B shows an example of the file header H having an area h12 for storing information that indicates the position of the main optical system (right or left).

Hereinafter, universal coordinate system information to be set in the areas h7 to h9, offset origin information to be set in the area h10, and specific area position information to be set in the area h11 will be described further.

[Universal Coordinate System]

Figure 10:
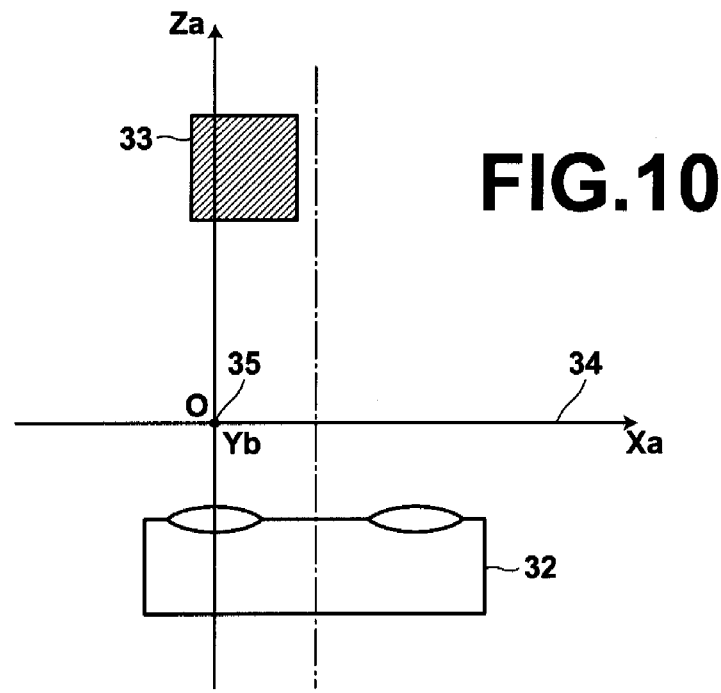
FIG. 10 is a drawing for explaining problems of inherent coordinate system.
Figure 11:
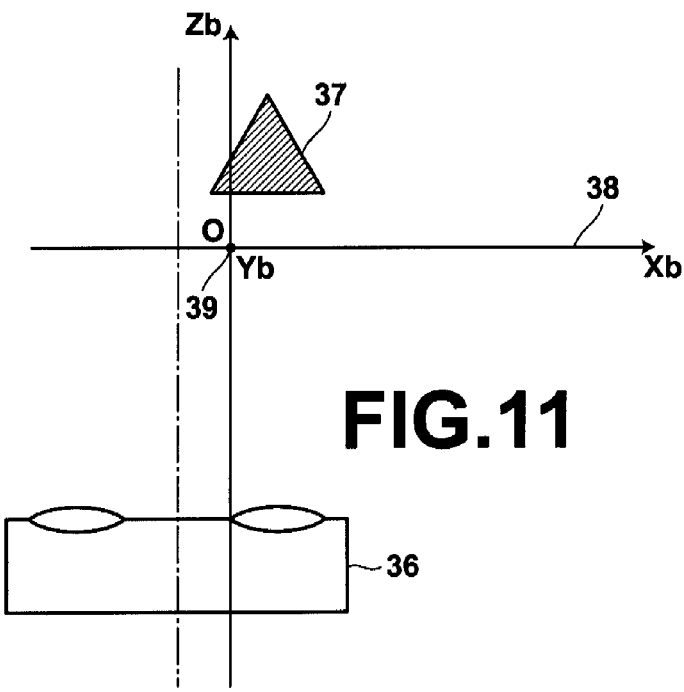
FIG. 11 is a drawing for explaining problems of inherent coordinate system.

FIG. 10 illustrates relationships among a first camera 32 having a function to obtain three-dimensional information (distance image, and the like) in a photography space, a photography space where a cubic object 33 is disposed, an inherent coordinate system 34 of the first camera 32, and the origin 25 of the inherent coordinate system 34. FIG. 11 illustrates the relationship among a second camera 36 having a function to obtain three-dimensional information (distance image, and the like) in a photography space, a photography space where a triangular object 37 is disposed, an inherent coordinate system 38 of the second camera 36, and the origin 39 of the inherent coordinate system 38. In FIGS. 10 and 11, the chain lines are the center lines separating the camera 32 and 36 into left and right halves respectively. In the photography space of FIG. 10, the object 33 is located on the left side of the center line of the camera 32, while in the photography space of FIG. 11, the object 37 is located on the right side of the center line of the camera 36. A comparison between FIGS. 10 and 11 clearly shows that the positions of the origins of the inherent coordinate systems are largely different from each other between the first camera 32 and the second camera 36. In FIGS. 10 and 11, Y-axes of the inherent coordinate systems 34 and 38 are perpendicular to the surfaces of the drawings and overlap with the origins 35 and 39.

Figure 12:
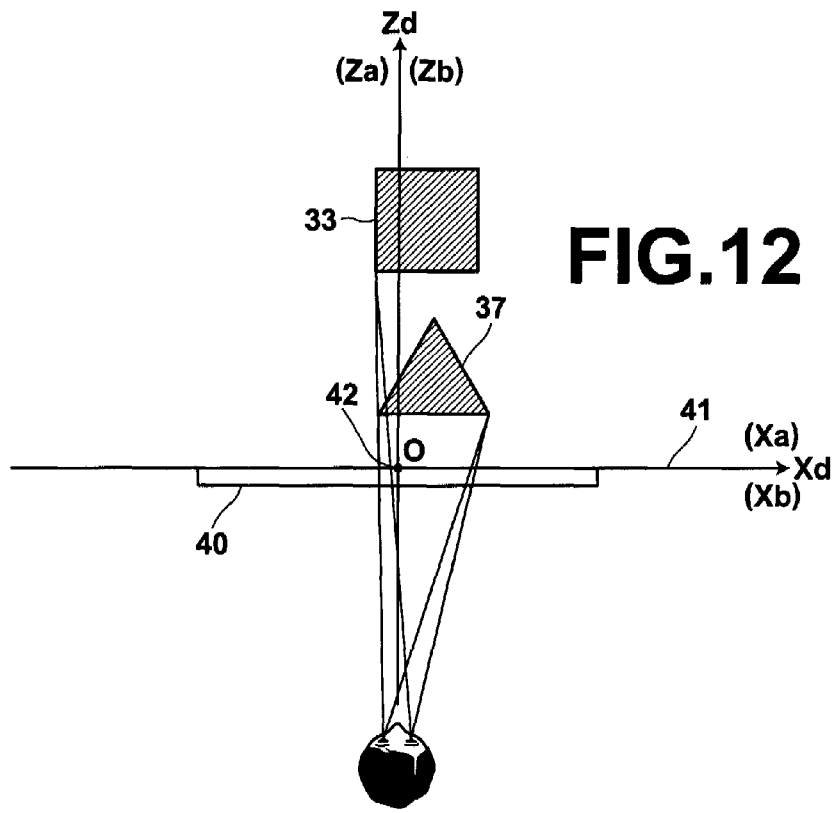
FIG. 12 is a drawing for explaining problems of inherent coordinate system.

FIG. 12 illustrates a relationship between a display coordinate system 41 and the objects 33 and 37 to be displayed when displaying a synthesized image of two pairs of parallax images obtained by two photography operations, one of which is performed with the positional relationships shown in FIG. 10 and other of which is performed with the positional relationships shown in FIG. 11, on the stereoscopic monitor 40. In the conventional methods, each pixel value of a distance image obtained in the inherent coordinate system is used directly as the value representing the field of depth of display. That is, the positional relationship between the origin 35 and object 33 in FIG. 10 is maintained as it is as the positional relationship between the origin 42 and the object 33 in the display coordinate system 41. Likewise, the positional relationship between the origin 39 and object 37 in FIG. 11 is maintained as it is as the positional relationship between the origin 42 and the object 37 in the display coordinate system 41. As the result, an image in which the object 33 is disposed behind the object 37 is displayed on the spectroscopic monitor 40, as illustrated in FIG. 13.

In the mean time, if the first camera 32 were used when performing the photography operation of the photography space including the object 37 with the positional relationships shown in FIG. 11, as in the photography operation of the photography space including the object 33, the object 33 would be disposed on the left side of the center of the camera and the object 37 on left side. Further, in the spectroscopic image obtained by image synthesis, the object 33 and object 37 would be displayed separately, as shown in FIG. 14, since Z-axis of the inherent coordinate system is located on the left side of the center of the camera.

Figure 13:
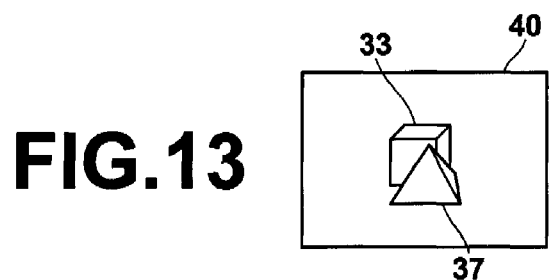
FIG. 13 is a drawing for explaining problems of inherent coordinate system.
Figure 14:
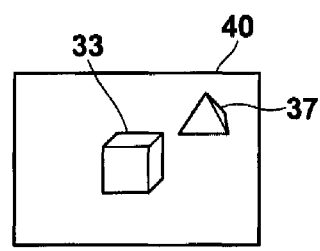
FIG. 14 is a drawing for explaining problems of inherent coordinate system.

As can be understood from the comparison of FIGS. 13 and 14, the conventional methods give rise to a problem that, when generating a synthetic stereoscopic image from a plurality of stereoscopic images, the result obtained by the synthesis differs depending on the camera used for the photography. For similar reasons, the conventional methods give rise to a problem that, when recognizing and controlling the shape or position of an object in a stereoscopic image, the recognition operation cannot be performed stably unless the same imaging system is used continuously.

The universal coordinate system is a coordinate system defined in a photography space, like the inherent coordinate system. However, whereas the inherent coordinate system is defined with respect to each camera and invisible to the user, the universal coordinate system is defined so as to be recognizable to the user.

Figure 15:
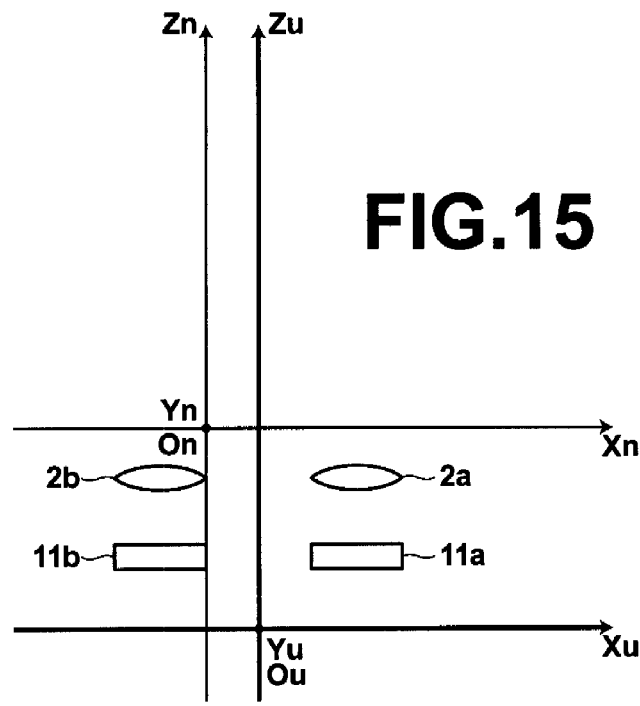
FIG. 15 illustrates an example of universal coordinate system.

FIG. 15 shows an example universal coordinate system superimposed on the inherent coordinate system of the stereo camera 1 shown in FIG. 5. In the example, the universal coordinate system is a three-dimensional orthogonal coordinate system with its Xu axis extending from left to right direction of the stereo camera 1, Yu axis extending from bottom to upward direction of the stereo camera 1, and Zu axis extending perpendicular to Xu axis and Yu axis from the stereo camera 1 toward the photography space. Further, in the example, the origin Ou of the universal coordinate system is located in the center of the rear surface of the stereo camera 1.

When generating an image file, an amount of displacement between the origins when the coordinate system is switched from the inherent coordinate system to the universal coordinate system, i.e., an amount of shift between the origin On of the inherent coordinate system and the origin Ou of the universal coordinate system is recorded. That is, a displacement vector with the origin On of the inherent coordinate system as the starting point and the origin Ou of the universal coordinate system as the end point is recorded. For example, where the position of the origin Ou of the universal coordinate system in the inherent coordinate system is represented by coordinate values (vector values) (xc, yc, zc), the values of xc, yc and zc are stored in the file header as displacement information of the universal coordinate system.

Once the displacement information of the universal coordinate system is stored in the header of an image file, processing using a distance image, such as stereoscopic image processing, shape recognition processing, or the like, may be performed after converting each pixel value of the distance image from coordinate values in the inherent coordinate system to coordinate values in the universal coordinate system. The problem of the conventional method described with reference to FIGS. 10 to 14 may be solved by converting each pixel value of a distance image obtained by the first imaging system from the coordinate values in the inherent coordinate system to the coordinate values in the universal coordinate system, converting each pixel value of a distance image obtained by the second imaging system from the coordinate values in the inherent coordinate system to the coordinate values in the universal coordinate system, and performing image synthesis using converted distance images.

Likewise, when cameras are changed in the middle of continuous photography, the conversion described above may be performed on each pixel value of distance images obtained by the previous and present camera, thereby the photography performed before changing cameras is prevented from being wasted. All of the other problems arising from the dependence of the coordinate system on camera may be solved by adopting the concept of universal coordinate system.

In the foregoing, an example case in which only one universal coordinate system is defined has been described to facilitate understanding. Hereinafter, another example case in which a plurality of coordinate systems to be selectable as the universal coordinate system, i.e., a plurality of universal coordinate system candidates is defined will be described. Where a plurality of universal coordinate systems is defined, displacement information of all of the coordinate systems selectable by the user and information for identifying the displacement information selected by the user are recorded in the file header H.

First, coordinate types of the universal coordinate system to be set in the area h7 will be described. The user may specify a coordinate type of the universal coordinate system in the setting screen displayed on the monitor 7 by the overall control section 19 prior to photography. The data inputted in the selection screen are temporarily stored in the displacement information storage section 24 shown in FIG. 2. The data are read out from the displacement information storage section 24 by the image file generation section 26 when generating an image file and recorded in the area h7. Here, it is assumed that either one of the numerical data "0", "1", and "2" is recorded in the area h7. The numerical data "0" indicate that the universal coordinate system is a three-dimensional orthogonal coordinate system, the numerical data "2" indicate that the universal coordinate system is a polar coordinate system, and the numerical data "0" indicate that the coordinate type is unknown, i.e., the user did not specify the coordinate type of the universal coordinate system.

Figure 16:
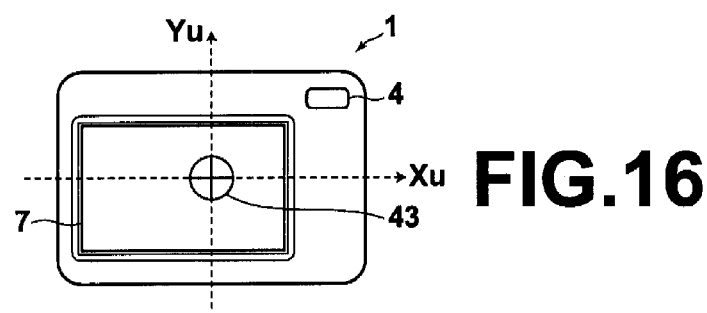
FIG. 16 illustrates an example of origin recognizable by appearance.
Figure 17:
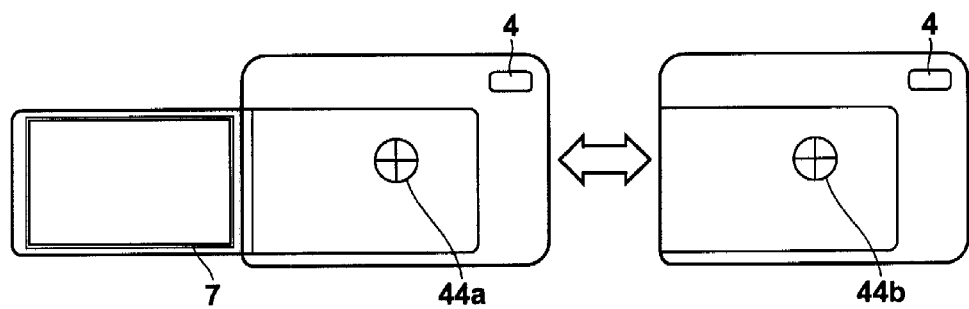
FIG. 17 illustrates another example of origin recognizable by appearance.

Next, displacement information to be set in the area h8 will be described. In the stereo camera 1, a total of 8 points, including the origin Ou0 of the inherent coordinate system and the center point Ou1 on the rear surface of the camera body described by way of example in the conceptual description of the universal coordinate system, are defined as the prospective points that can be the origin of the universal coordinate system. The center point on the rear surface of the camera body is made visually recognizable by appearance of the camera by displaying a reference mark 43, by way of example, on the monitor 7 as shown in FIG. 16. Note that, however, the reference mark 43 is displayed only when a predetermined operation is performed by the user. If the camera is of a type having an open/close type monitor and rear surface state thereof changes depending on whether or not the monitor is used, reference marks 44$a$ and 44$b$ may be provided on an outer shell of the camera by printing or machining, as shown in FIG. 17.

In this way, provision of the origin of the universal coordinate system on an externally recognizable position of an externally recognizable member of the camera allows positional alignment to be performed, for example, when changing cameras by disposing the cameras such that the reference marks come to the same position before and after the changing.

Figures 18, 19:
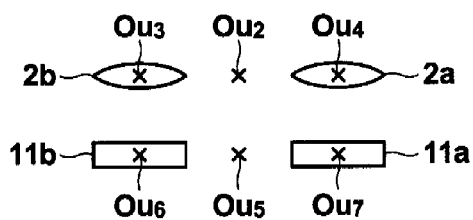
FIG. 18 illustrates another candidate of origin of the universal coordinate system.
FIG. 19 illustrates a detailed format of an area h8 for setting displacement information.

FIG. 18 shows other points defined as the candidates of the origin of the universal coordinate system. As illustrated, the center point Ou2 between the imaging lenses 2$a$ and 2$b$, center points Ou3 and Ou4 of the respective imaging lenses 2$a$ and 2$b$, center point Ou5 between the CCDs 11$a$ and 11$b$, and center points Ou6 and Ou7 of the respective CCDs 11$a$ and 11$b$ are defined as the candidates of the origin of the universal coordinate system. These points are not externally recognizable, but even a point located inside of the camera body and normally not visually observable can be the origin of the universal coordinate system, if it has a certain characteristic, such as the center point or end point of a predetermined member.

The coordinate values of 8 points, Ou0 to Ou7, in the inherent coordinate system, i.e., displacement information is stored in the displacement information storage section 24 upon manufacture of the camera. Where the imaging system includes a zoom lens whose focal length is variable, however, the inherent coordinate system is reset according to the characteristics of the imaging system, so that the displacement information stored in the displacement information storage section 24 is reset according to the change in the focal length. The overall control section 19 detects a focal length set by a zoom operation, and rewrites the displacement information stored in the displacement information storage section 24 according to the detected focal length. The correspondence between the focal length and the origin of the inherent coordinate system is registered in the RAM 21 or the like in advance. Thus, the displacement information may be reset by referring to the correspondence relationship to obtain the origin of the inherent coordinate system corresponding to the detected focal length and recalculating the displacement with respect to the origin. The image file generation section 26 reads out the displacement information stored or reset in the manner as described above from the displacement information storage section 24 and stores in the area h8 of the file header.

FIG. 19 illustrates a detailed format of the area h8 for setting displacement information. The area h8 includes a plurality of areas, each for storing an identifier and displacement information associated with each other. The identifier is a numerical value, alphabet, or a symbol value. FIG. 19 illustrates, by way of example, a format of the area h8 that uses serial numbers starting from 0 as the identifiers. Preferably, a common rule is provided in advance, which defines which area should include displacement information of which point. Here, it is assumed that displacement information of the point Ou0 described above (i.e., 0, 0, 0) is recorded associated with the identifier 0, displacement information of the point Ou1 (reference mark position) is recorded associated with the identifier 1, and displacement information of the points Ou2 to Ou7 shown in FIG. 18 are recorded associated with the identifiers in ascending order.

In addition to the areas where the displacement information is set by the stereo camera 1, the area h8 also includes areas for setting displacement information by a camera having only one imaging lens and one CCD. That is, the area where displacement information of the center point of the one imaging lens is set (area with identifier 8) and the area where displacement information of the center point of the one CCD (area with identifier 9) is set are provided. The area h8 further includes a spare area (area with identifier 10). Each unused area includes a value 0, 0, 0, as shown in FIG. 19.

Next, user-specified information to be set in the area h9 shown in FIG. 9 will be described. The user-specified information is received prior to photography in the setting screen displayed on the monitor 7 by the overall control section 19, like the coordinate type. The data inputted in the selection screen are temporarily stored in the displacement information storage section 24 shown in FIG. 2, then read out by the image file generation section 26 and set in the area h9. A value "0" or an identifier value that indicates one of displacement information specified by the user is set in the area h9. The value of "0" means that user did not select any displacement information.

As described above, where the file header is structured so as to accommodate displacement information of a plurality of coordinate systems, and an identifier indicating displacement information and a coordinate type specified by the user, the user may select a most convenient universal coordinate system for performing processing using the image file and obtain convenience not available from the conventional methods by using the universal coordinate system. Further, if the universal coordinate system becomes disadvantageous, the user may specify another coordinate system as the universal coordinate system. In this way, the user may select a universal coordinate system according to the objective, whereby the objective may be accomplished more easily.

[Offset Origin]

Next, the offset origin will be described. The positional alignment using the universal coordinate system is based on the assumption that the camera can be disposed at a desired position. In actual photography sites, however, the camera is not always disposed at a desired position. Thus, there may be a case in which the position of origin of the universal coordinate system needs to be further adjusted. The offset origin is a post adjustment origin when a positional adjustment of the origin of the universal coordinate system becomes necessary. The offset origin is set as an offset value in each coordinate axis direction, that is, as coordinate values in the universal coordinate system.

The offset origin is set by the user performing photography by operating the operation button 5 while observing a predetermined setting screen displayed on the monitor 7. The display of the setting screen on the monitor 7, and capture and record of the offset value set by the user are controlled by the overall control section 19. When the offset origin is set, an image adjusted according to the offset value is displayed on the monitor 7. The user may confirm whether or not the offset value set by the user is adequate by observing the display. Further, when setting the offset origin, a predetermined position within the photography space may be determined as a specific area, and the specific area may be displayed as a confirmation image which is easily confirmable.

Figure 20:
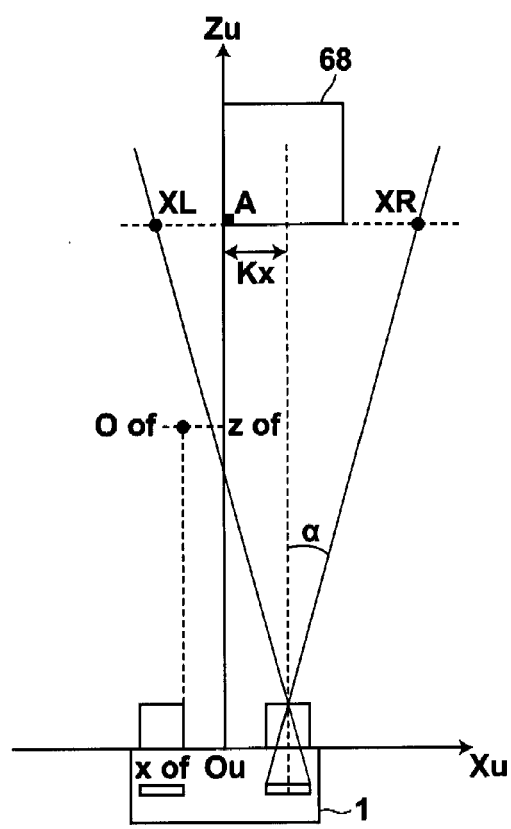
FIG. 20 is a drawing for explaining offset origin.

FIG. 20 shows a universal coordinate system arranged in a photography space in which an object 68 is disposed, with the left-right direction, up-down direction, and rear to front direction of the stereo camera 1 being taken as Xu axis, Yu axis (not shown), and Zu axis respectively and the center point Ou of the two imaging lenses as the origin. The coordinate value of an offset origin Oof in the universal coordinate system is expressed as (xof, yof, zof). That is, offset values in X-axis, Y-axis, and Z-axis directions are expressed as xof, yof, and zof respectively. A specific area A is an area specified by the user. Hereinafter, setting processing of the offset origin Oof will be described using the photography space shown in FIG. 20 by way of example. The offset origin Oof is set step by step, like setting the offset value zof in Z-axis direction first, then setting the offset values xof and yof in XY-axis directions.

Figure 21:
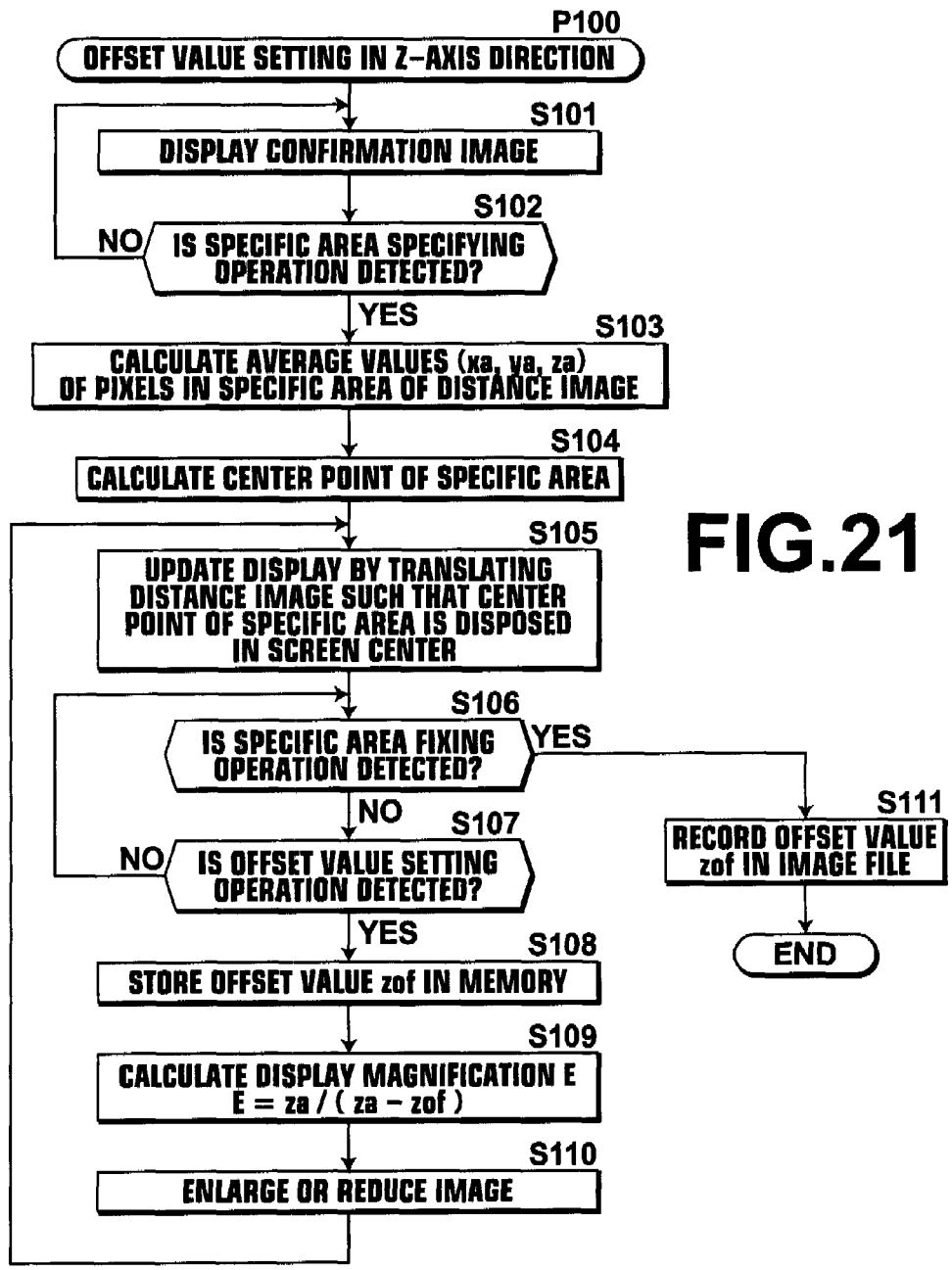
FIG. 21 illustrates an example of Z-axis offset value setting process.

Example offset value setting processing in Z-axis direction is shown in FIG. 21. When an operation for displaying an offset setting screen is detected, the overall control section 19 instructs the confirmation image generation section 67 to generate a confirmation image. The confirmation image generation section 67 obtains RGB data and a distance image from the image file generated by the image file generation section 26 and forms a parallax image of right eye with numerical information indicating the offset origin combined therewith and supplies to the display control section 15. This causes the confirmation image to be displayed on the monitor 7 (S101). Here, the offset origin is set at the same point as the origin of the universal coordinate system.

When an operation for specifying a predetermined point or an area within the photography space as the specific area A is detected (S102), the overall control section 19 instructs the confirmation image generation section 67 to form an image to be displayed on the monitor 7 with reference to the specific area A. In response to the instruction, the confirmation image generation section 67 first calculates average values (xa, ya, za) of the pixels corresponding to the specific area A of the distance image (S103). The confirmation image generation section 67 also calculates a position coordinate of the center point of the specific area of the distance image in the universal coordinate system (S104). Where the specific area A includes only one pixel, the pixel value directly becomes the average value (xa, ya, za), and the position of the pixel becomes the center point.

Figure 22:
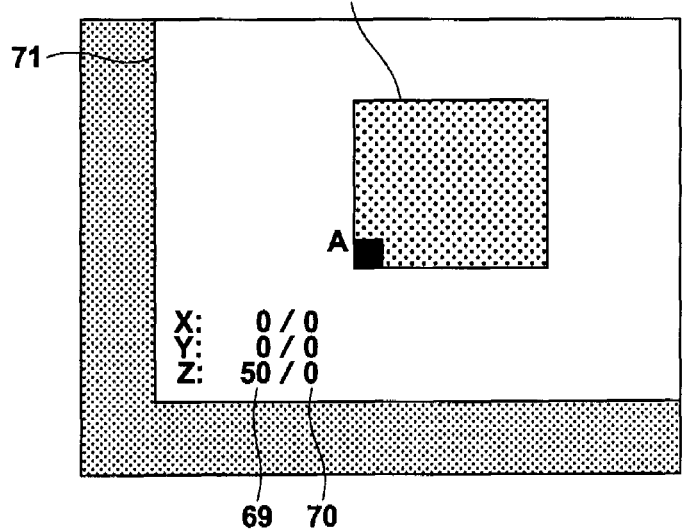
FIG. 22 illustrates an example display of Z-axis offset value setting screen.

Then, the confirmation image generation section 67 synthesizes a specific area mark at the center point, and translates the image such that the center point is disposed in the center of the screen and supplies the image to the display control section 15 (S105). FIG. 22 shows an example display on the monitor screen after translation. As illustrated, a position coordinate 69 of the center point of the specific area A when the offset origin is set is displayed on the monitor 7 together with the image. Further, an offset value 70 is displayed on the right side of the coordinate value 69. When the image is translated, the image area 71 sometimes becomes smaller than the display screen. If such is the case, the area on the monitor screen where the image is not displayed is shown in black.

When an operation for fixing the offset value is detected (S106), the overall control section 19 instructs the image file generation section 26 to record the offset value zof being set at that point in time as a fixed offset value in Z-axis direction (S111). Here, the value (xa, ya, za) calculated with respect to the specific area is also recorded in the image file.

In the mean time, if an offset value fixing operation has not been detected yet (S106), the overall control section 19 keeps waiting for an offset value fixing operation. When an offset setting operation is received (S107), the offset value zof set by the setting operation is stored temporarily in a predetermined memory (S108). Then, a display magnification E of the confirmation image is calculated base on Formula (1) below (S109), and the confirmation image is enlarged or reduced so as to be displayed at the calculated display magnification E (S110).

$$E = za/(za-zof) \quad (1)$$

Figure 23:
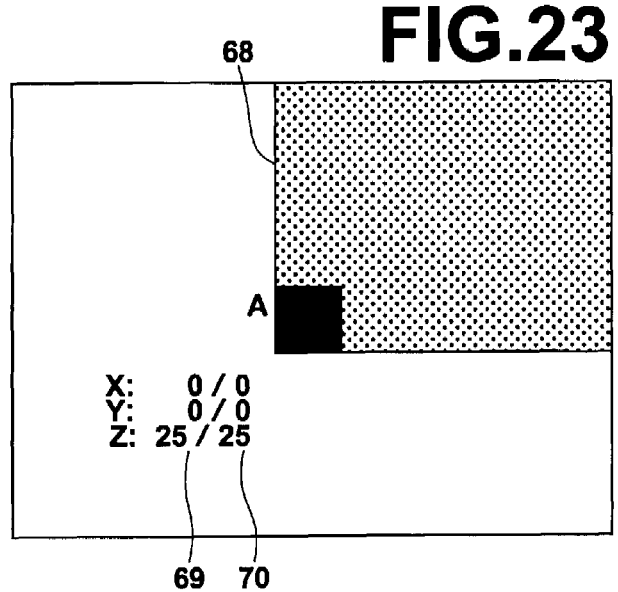
FIG. 23 illustrates an example display of Z-axis offset value setting screen.
Figure 24:
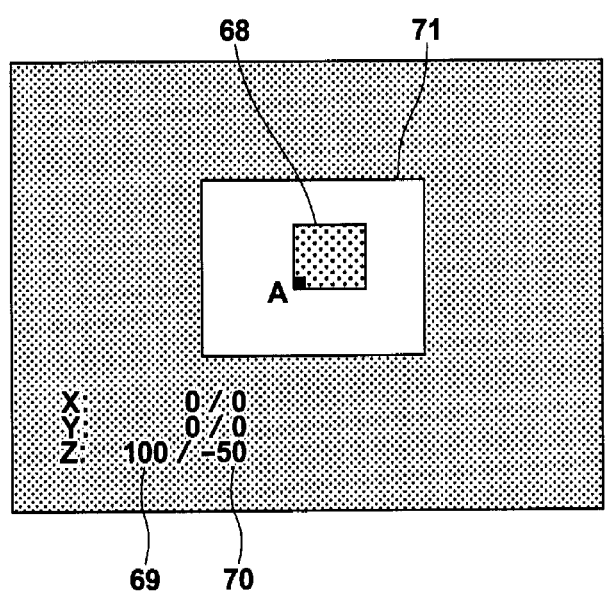
FIG. 24 illustrates an example of Z-axis offset value setting process.

FIG. 23 illustrates an example screen when the confirmation image is enlarged, and FIG. 24 illustrates an example screen when the confirmation image is reduced.

After translating the enlarged or reduced image such that the center point of the specific area is disposed in the center of the screen, the confirmation image generation section 67 supplies the image to the display control section to update the display (S105). Thereafter, steps S101 to S110 are repeated until an offset value fixing operation is detected in step S106.

Figure 25:
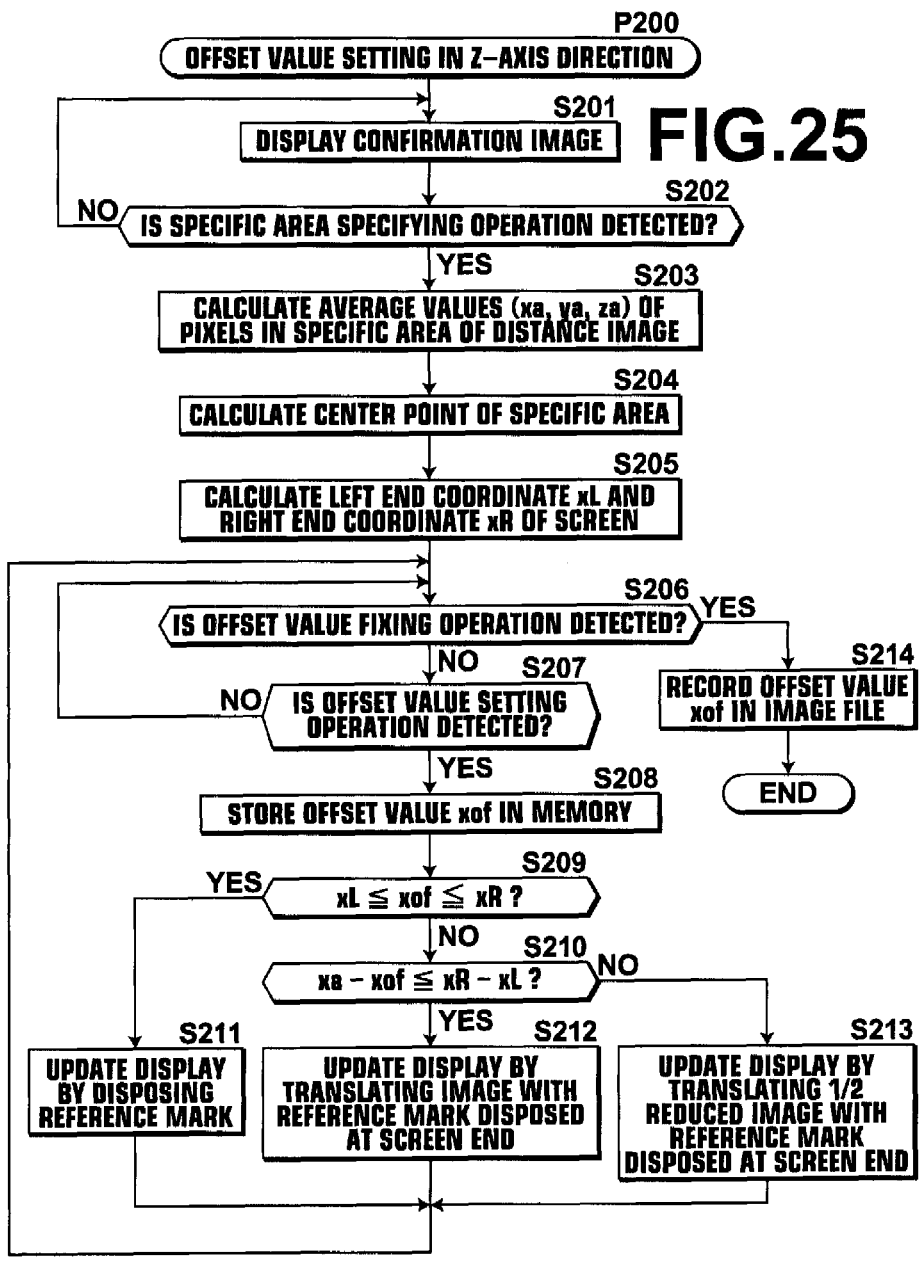
FIG. 25 illustrates an example of X-axis offset value setting process.

Next, Example offset value setting processing in X-axis direction is shown in FIG. 25. The overall control section 19 causes the confirmation image to be displayed on the monitor 7 (S201), detects a specific area specifying operation (S202), and instructs the confirmation image generation section 67 to form a confirmation image with reference to the specific area A, as in the offset value setting processing in Z-axis direction. In response to the instruction, the confirmation image generation section 67 calculates average values (xa, ya, za) of the pixels corresponding to the specific area A of the distance image (S203). Then, it further calculates a position coordinate of the center point of the specific area (S204).

In the offset value setting processing in XY-axis directions, the confirmation image generation section 67 next reads out a value a of photographing field angle (FIG. 20) stored in the area h4 of the image file. Otherwise, if the value ax of the field angle is stored in one of the internal memories, such as the memory 23, the value α may be read out from the memory. Further, the confirmation image generation section 67 refers to an x coordinate value of the center point between the imaging lenses stored in the area h8 of the image file and calculates a difference Kx (FIG. 20) from the x coordinate value of the center of the specific area A. Then, it calculates coordinate values xL, xR of a left end portion XL and a right end portion XR (FIG. 20) of the range displayed on the monitor 7 in the universal coordinate system based on Formula 2 below.

$$xL = Kx - za \times \tan\alpha$$
$$xR = Kx + za \times \tan\alpha \quad (2)$$

When an operation for fixing the offset value is detected (S206), the overall control section 19 instructs the image file generation section 26 to record the offset value xof being set at that point in time as a fixed offset value in X-axis direction (S214). Here, the values (xa, ya, za) calculated with respect to the specific area is also recorded in the image file.

In the mean time, if an offset value fixing operation has not been detected yet (S206), the overall control section 19 keeps waiting for an offset value fixing operation. When an offset setting operation is received (S207), the offset value xof set by the setting operation is stored temporarily in a predetermined memory (S208).

Then, the overall control section 19 determines whether or not the offset value xof falls within the display width of the monitor 7 in X-axis direction base on Determination Formula (3) below (S209).

$$xL \leq xof \leq xR \quad (3)$$

Figure 26:
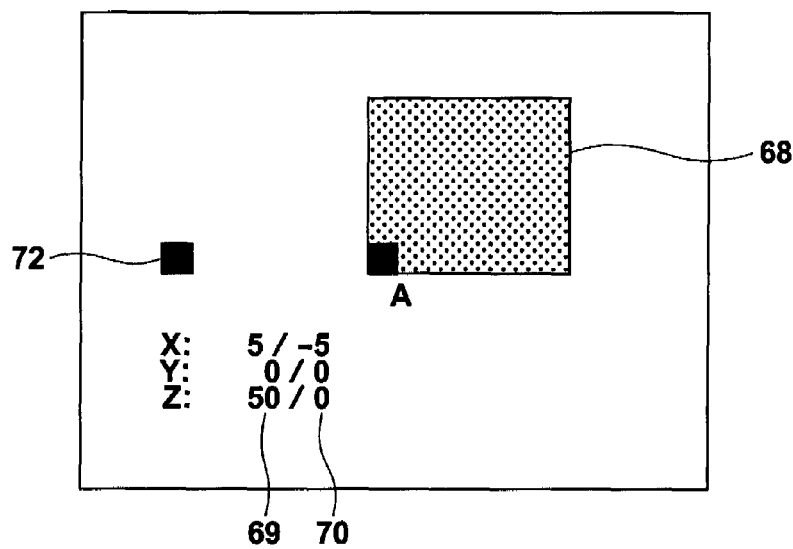
FIG. 26 illustrates an example display of X-axis offset value setting screen.

If the value xof satisfies the condition of Determination Formula (3), the confirmation image generation section 67 generates a confirmation image with a mark 72 indicating the position of the offset origin (reference mark 72) disposed therein, as illustrated in FIG. 26 as an example. The reference mark 72 is disposed at the position having the x coordinate value which is the same as the offset value xof and the y coordinate value which is the same as the y coordinate value ya of the specific area.

For example, if the number of display pixels in the horizontal direction is assumed to be Ph, the unit distance of the coordinate system corresponds to ΔPx pixels expressed by Formula (4) below.

$$\Delta Px = Ph/(2 \cdot \tan\alpha \cdot za) \quad (4).$$

Thus, if the offset value is changed in the offset setting screen and the amount of change is Δxof, the display only needs to be controlled such that the reference mark 72 is displayed at a position shifted by Δxof·ΔPx pixels.

Display of two marks, reference mark 72 and specific area mark, facilitates understanding how far the offset origin and the center point of the specific area are separated away from each other in X-axis direction. In addition, the coordinate value 69 of the center point of the specific area A is also displayed in the confirmation image. Still further, the offset value 70 is displayed on the right side of the coordinate value 69. The confirmation image is supplied to the display control section 15, and the display of the monitor 7 is updated (S211).

Figure 27:
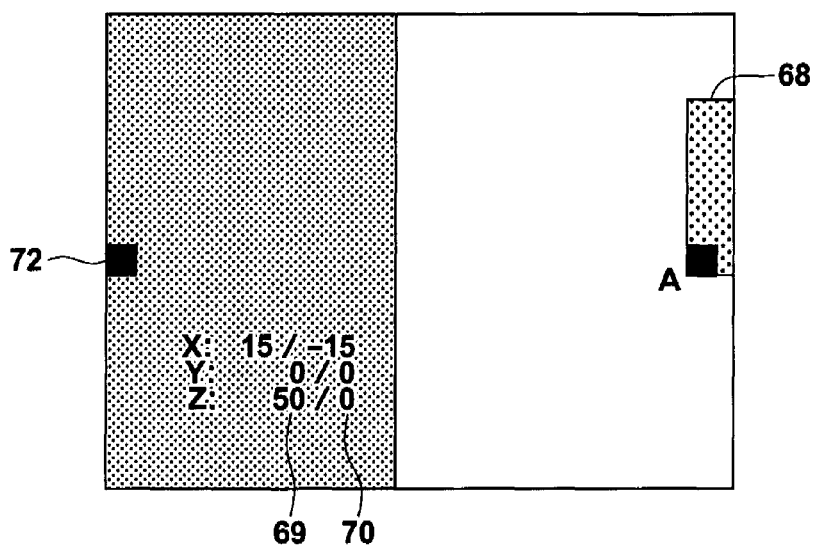
FIG. 27 illustrates an example display of X-axis offset value setting screen.

In the mean time, if the value xof does not satisfy the condition of Determination Formula (3), the overall control section 19 further makes a determination based on Formula (5) below (S210).

$$xa - xof \leq xR - xL \quad (5)$$

Where the value xof lies within a range that satisfies the condition of Determination Formula (5), the confirmation image generation section 67 generates an image in which the reference mark 72 is translated so as to be displayed on a left end portion (or right end portion) of the screen, and supplies the image to the display control section 15 to update the display, as illustrated in FIG. 27 as an example. Where the value xof is increased or decreased, only the image of the object 68 including the specific area mark is moved by Δxof·ΔPx pixels in the left or right direction on the monitor screen with the reference mark 72 remains fixed on the left end portion (S212).

Figure 28:
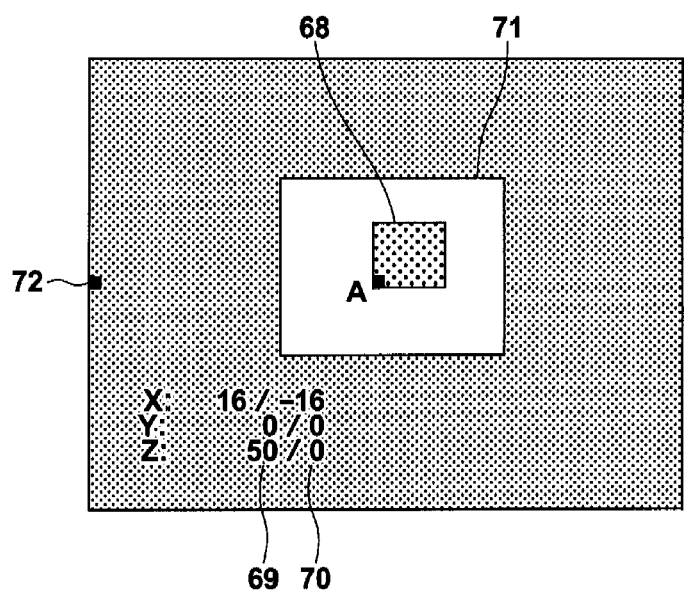
FIG. 28 illustrates an example display of X-axis offset value setting screen.

On the other hand, where the value xof lies within a range that does not satisfy Determination Formula (5), the confirmation image generation section 67 generates a reduced parallax image for right eye with the specific area mark and the reference mark disposed therein, as illustrated in FIG. 28 as an example. It assumed here that the parallax image for right eye is reduced to ½. Even when the value xof lies within a range that does not satisfy Determination Formula (5), the confirmation image generation section 67 generates an image in which the reference mark 72 is translated so as to be disposed on a left end portion (or right end portion) of the screen, and supplies the image to the display control section 15 to update the display (S213).

Thereafter, steps S207 to S213 are repeated until an offset value fixing operation is detected in step S206.

The overall control section 19, confirmation image generation section 67, and display control section 15 also perform processing identical to that described with reference to FIGS. 25 to 28 with respect to Y-axis. This causes the offset value yof in Y-axis direction and the coordinate value of the specific area when the offset value is set to be recorded in the image file by the image file generation section 26.

Upon receipt of an instruction from the overall control section 19 in step S111 or step S214, the image file generation section 26 reads out the values xof, yof, and zof stored in the memory and stores in the area h10 of the header H of the image file. Further, it reads out position coordinates of the specific area stored in the memory and stores in the area h11 of the header H of the image file.

The area h10 includes a flag that indicates presence or absence of offset origin and offset values xof, yof, and zof. The value of the flag is set to 1 when the offset origin is set or to 0 when the offset origin is not set. Where the value of the flag in the area h10 is set to 0, the area 10 does not include any offset value, and the area h11 does not include any coordinate value of the specific area. If the area h10 or area h11 should include a certain value, it is invalid. Note that the information to be stored in the area h10 may be limited to the offset values xof, yof, and zof. Storage of the values to the area h11 is not essential, and a file format without the area h11 is also possible.

[Calculation of Photographing Field Angle]

As described above, the confirmation image generation section 67 reads out a value of photographing field angle stored in the area h4 or a memory, such as the memory 23, and performs calculations. In this case, use of an approximate value, such as a nominal value, as the value of photographing field angle may cause a slight displacement in the display range or display position of each mark. Consequently, the stereo camera 1 includes a means for calculating an accurate value of photographing field angle using a distance image. In the present embodiment, the section that uses a value of photographing field angle is the confirmation image generation section 67, so that the means for calculating a value of photographing field angle is provided as a component of the confirmation image generation section 67. It should be appreciated that a dedicated processor or the like may be provided separately from the confirmation image generation section 67.

Figure 29:
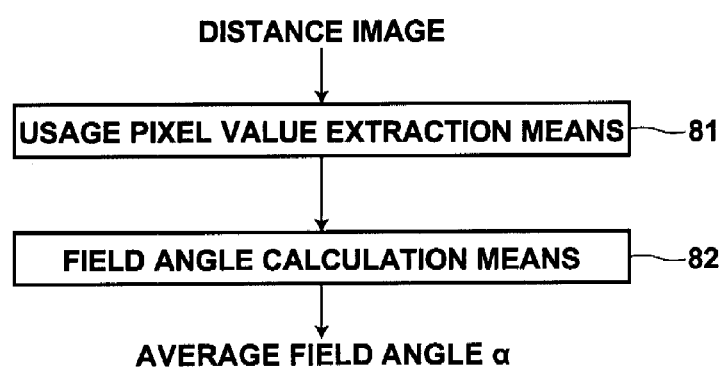
FIG. 29 illustrates a photographing field angle calculation means.

FIG. 29 illustrates a means for calculating a photographing field angle. As illustrated, confirmation image generation section 67 includes a usage pixel value extraction means 81 for extracting a value of a pixel used for calculating a photographing field angle (usage pixel) and a field angle calculation means 82 for calculating a field angle using the value extracted by the usage pixel value extraction means 81.

Figure 30A:
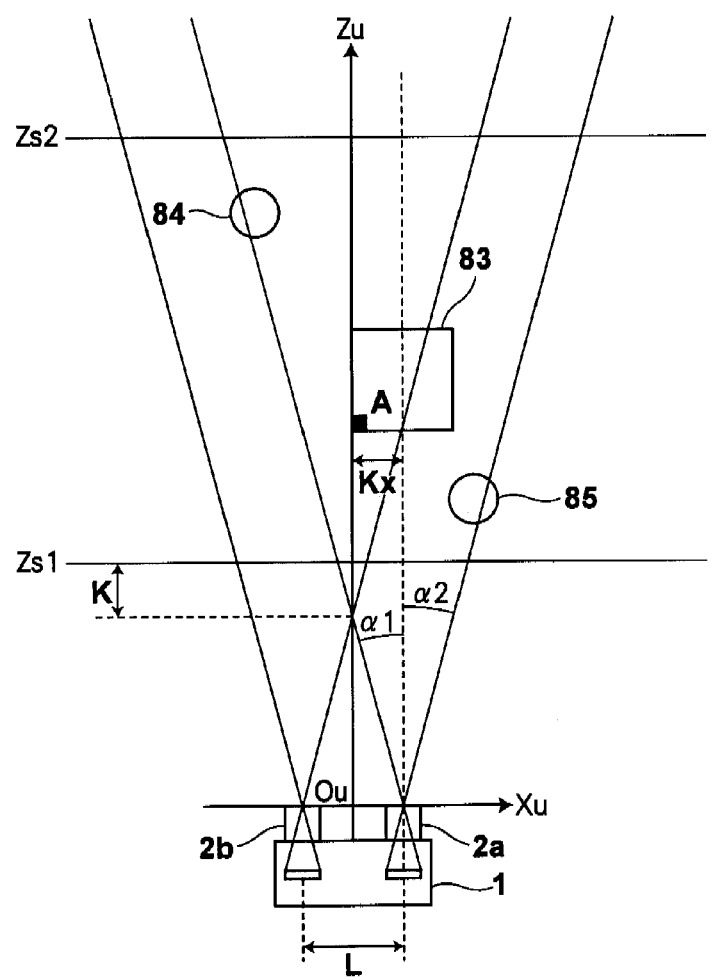
FIG. 30A is a drawing for explaining a photographing field angle calculation method.
Figure 30B:
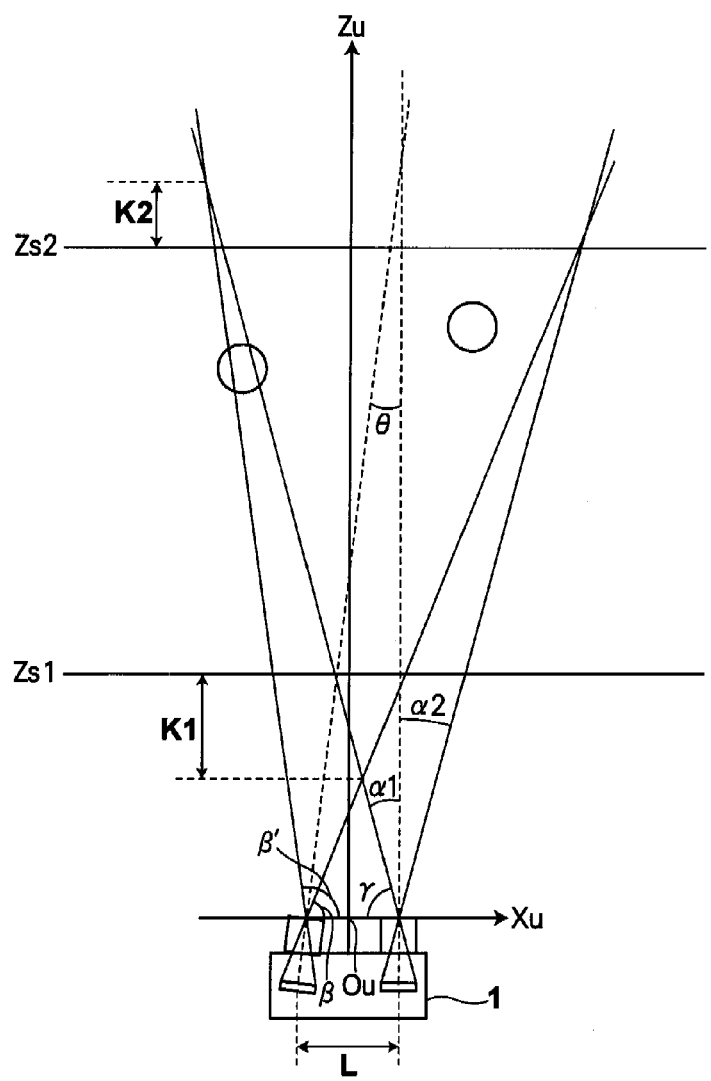
FIG. 30B is a drawing for explaining a photographing field angle calculation method.
Figure 31:
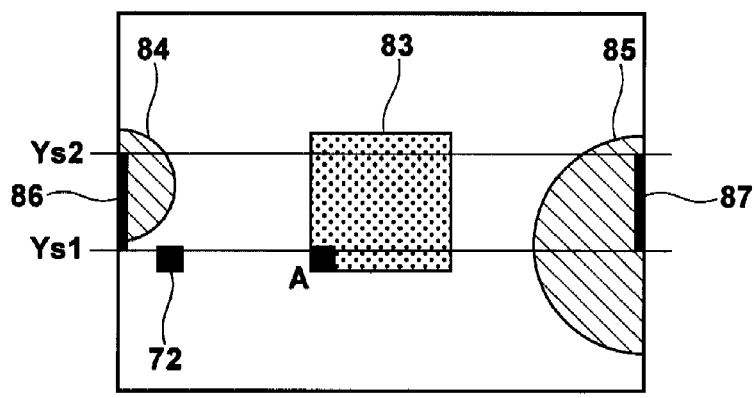
FIG. 31 is a drawing for explaining a photographing field angle calculation method.

Hereinafter, two examples will be described as the processing performed by the usage pixel value extraction means 81 and field angle calculation means 82. In order to facilitate understanding, the description will be made with reference to FIGS. 30A and 30B which illustrate positional relationships among objects 83, 84, 85 and the stereo camera 1, disposed in a photography space, in a universal coordinate system. FIG. 30A illustrates a case in which the angle of convergence is 0 degree, and FIG. 30B illustrates a case in which the angle of convergence is an angle θ which is other than 0. FIG. 31 illustrates, by way of example, a confirmation image generated using an image obtained through the lens 2a, in which the objects 84 and 85 cross left and right ends of the field angle respectively.

Processing Example 1

Figure 32A:
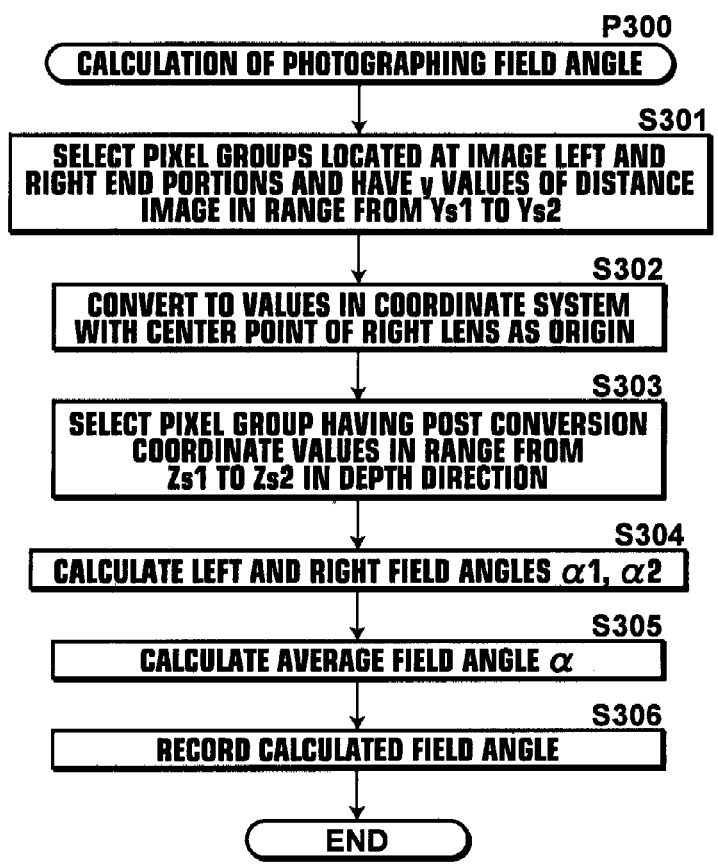
FIG. 32A is a flowchart illustrating an example of photographing field angle calculation process.

The usage pixel value extraction means 81 obtains a distance image by referring to an image file stored in the memory 23, and calculates the photographing field angle in the following steps. FIG. 32A illustrates steps for calculating a photographing field angle in the horizontal direction.

The usage pixel value extraction means 81 selects usage pixels from pixel forming the distance image according to a predetermined selection criterion. As illustrated in FIG. 31, the usage pixel value extraction means 81 first selects pixel groups 86 and 87 located respectively at left and right end portions of the image and have coordinate values in the range from Ys1 to Ys2 in Y coordinate direction of the image (S301). The boundary values Ys1 and Ys2 will be described later.

Next, the usage pixel value extraction means 81 defines a coordinate system with the center point of the right imaging lens of the stereo camera 1 as the origin, and converts the pixel values of the selected pixels to values represented by the coordinate system (S302). Then, it further selects a pixel group having post conversion coordinate values in the range from Zs1 to Zs2 in the depth direction from the selected pixels (S303). Here, it is assumed that n pixels (n is an integer number) are selected from the pixel groups 86 and 87 respectively. The boundary values Zs1 and Zs2 will be described later.

Pixel values of the selected pixel groups are supplied to the field angle calculation means 82. The field angle calculation means 82 calculates a field angle $\alpha 1$ (left) and a field angle $\alpha 2$ (right) shown in FIG. 30A by performing the arithmetic operations shown in Formula (6) below (S304).

$$\alpha 1 = \arctan(\Sigma(xli/zli)/n)$$

$$\alpha 2 = \arctan(\Sigma(xri/zri)/n) \qquad (6)$$

In Formula (6), the xli represents an x value of $i^{th}$ (i=1 to n) pixel of n pixels selected from the pixel group 86, and the xri represents an x value of $i^{th}$ (i=1 to n) pixel of n pixels selected from the pixel group 87. Likewise, the zli represents a z value of $i^{th}$ (i=1 to n) pixel of n pixels selected from the pixel group 86, and the zri represents a z value of $i^{th}$ (i=1 to n) pixel of n pixels selected from the pixel group 87.

Next, the field angle calculation means 82 calculates an average field angle by performing an arithmetic operation shown in Formula (7) below (S305).

$$\alpha = (\alpha 1 + \alpha 2)/2 \qquad (7)$$

So far, example processing for obtaining the photographing field angle in the horizontal (X axis) direction has been described. When obtaining the photographing field angle in the vertical (Y axis) direction, it is only necessary to perform processing by replacing the processing in X axis direction in the example with processing in Y direction. That is, selecting pixel groups that satisfy predetermined conditions from pixels located upper and lower end portions of the image and performing calculations identical to those described above.

The calculated field angle values are recorded in an internal memory, such as the memory 23 (S306), and used when obtaining the display range or display position of the reference mark 72. At the same time, the calculated field angle values are supplied to the image file generation section 26 and recorded in the area h4 of the header of the image file. In the next display of the confirmation image, the values recorded in the memory or image file are used, so that the time required for display processing is reduced significantly.

The field angle values may be recorded so as to overwrite already recorded approximate values. Preferably, however, a storage area for the calculated values is provided separately from the area where the approximate values are recorded, and both the approximate and calculated values are stored in the file header H. This allows the approximate and calculated values to be used selectively.

Processing Example 2

The processing example 1 is applicable to the file header H of an image file of either type shown in FIG. 9A or 9B. The processing described below is, however, suitable for the file header H of the type shown in FIG. 9B. Hereinafter, an example case in which YCC data are generated using an image obtained through the imaging lens 2a only, and a distance image is generated using information obtained through imaging lenses 2a and 2b will be described. In the description below, it is assumed that the convergence angle is 0 degree, and optical axes of the imaging lenses 2a and 2b are parallel to each other.

In the example shown in FIG. 30A, the imaging lens 2a captures the objects 83, 84, and 85, but the imaging lens 2b does not capture an area on the right side including the object 85. Accordingly, in the processing performed by the distance image generation section 25, a value with respect to the right side area including the object 85 is not calculated or otherwise only a low accuracy value is obtained. On the other hand, the left side area including the object 84 is captured by both of the imaging lenses 2a and 2b, so that an accurate z value is calculated for the left side area. In this case, the accuracy of calculated photographing field angle depends on which of pixel groups on left or right end is used in the calculation. Preferably, in this case, the photographing field angle is calculated using only the pixel group on the side having a more accurate z value.

FIG. 32B is a flowchart illustrating the steps performed by the usage pixel value extraction means 81 and field angle calculation means 82 when calculating a photographing field angle in the horizontal direction in the processing example 2.

The usage pixel value extraction means 81 refers to information stored in the area 12 of the file header, i.e., the information of main optical system position (S311) and determines whether the main optical system position is right or left (S312). If the main optical system position is right, the usage pixel value extraction means 81 selects a pixel group located on the left end of the image and has a coordinate value in the range from Ys1 to Ys2 in Y coordinate direction of the distance image (S313R).

Next, the usage pixel value extraction means 81 defines a coordinate system with the center point of the right imaging lens of the stereo camera 1 as the origin, and converts the pixel values of the selected pixels to values represented by the coordinate system (S314R). Then, it further selects a pixel group having a post conversion coordinate value in the range from Zs1 to Zs2 in the depth direction from the selected pixels (S315R). Here, it is assumed that n pixels (n is an integer number) are selected from the pixel group selected in step S313R.

Pixel values of the selected pixel group are supplied to the field angle calculation means 82. The field angle calculation means 82 calculates a field angle $\alpha 1$ (left) shown in FIG. 30A by performing the arithmetic operation shown in Formula (6') below (S316R).

$$\alpha 1 = \arctan(\Sigma(xli/zli)/n) \quad (6')$$

In Formula (6'), the xli represents an x value of $i^{th}$ (i=1 to n) pixel of n pixels selected from the selected pixel group. Likewise, the zli represents a z value of $i^{th}$ (i=1 to n) pixel of n pixels selected from the selected pixel group.

In the mean time, if the main optical system position is left in step S312, the usage pixel value extraction means 81 a pixel group located on the right end of the image and has a coordinate value in the range from Ys1 to Ys2 in Y coordinate direction of the distance image is selected (S313L).

Next, the usage pixel value extraction means 81 defines a coordinate system with the center point of the left imaging lens of the stereo camera 1 as the origin, and converts the pixel values of the selected pixels to values represented by the coordinate system (S314L). Then, it further selects a pixel group having a post conversion coordinate value in the range from Zs1 to Zs2 in the depth direction from the selected pixels (S315L). Here, it is assumed that n pixels (n is an integer number) are selected.

Pixel values of the selected pixel group are supplied to the field angle calculation means 82. The field angle calculation means 82 calculates a field angle $\alpha 2$ (right) shown in FIG. 30A by performing the arithmetic operation shown in Formula (6") below (S316L).

$$\alpha 2 = \arctan(\Sigma(xri/zri)/n) \quad (6")$$

In Formula (6"), the xri represents an x value of $i^{th}$ (i=1 to n) pixel of n pixels selected from the selected pixel group. Likewise, the zri represents a z value of $i^{th}$ (i=1 to n) pixel of n pixels selected from the selected pixel group.

The field angle value calculated in step S316R or S316L is recorded in an internal memory, such as the memory 23, by the field angle calculation means 82 (S317). The calculated field angle value is also supplied to the image file generation section 26 and recorded in the area h4 of the header of the image file. Preferably, the area where the field angle value is to be stored is separated from the storage area where an approximate value is stored, as in the processing example 1.

In the example described above, a pixel group at only either one of the right and left end portion is selected. Where a photography operation is performed with the stereo camera 1 being tilted by 90 degrees or with a stereo camera having two optical systems aligned in the vertical direction, either one of pixel groups on the upper and lower end portions is selected. Where a distance image is generated using two single lens cameras instead of a stereo camera, an overlapping range captured by the two optical systems is estimated or calculated based on the positional relationship between the two cameras, and a pixel group on the end portion of the side included in the range is selected.

[Usage Pixel Value Extraction Range]

Hereinafter, a method of determining the usage pixel value extraction range, i.e., the boundary values Ys1, Ys2, Zs1, and Zs2 will be described. The boundary values may be obtained from a memory storing them in advance or obtained by calculation performed by the usage pixel value extraction means 81.

The boundary values Ys1 and Ys2 are determined so as to define a central portion or a narrower area than the central portion when the image is roughly trisected in the vertical direction. In the example shown in FIG. 31, the Ys1 and Ys2 are determined such that pixel groups within a range which is slightly narrower than the central ⅓ portion are selected. The reason is to improve calculation accuracy of photographing field angle by using values of pixels in a central area where impact of lens distortion is small. Note that, however, the impact of lens distortion depends also on the performance of the lens. Therefore, it is preferable that the boundary values Ys1 and Ys2 be determined based on the type and performance of the imaging system used for generating the distance image. Use of the central portion when the image is roughly trisected is only a guideline. The boundary values Ys1 and Ys2 obtained based on the principle described above are stored in a memory in advance and used in calculation.

The boundary values Zs1 and Zs2 are determined such that predetermined accuracy is ensured for z value within the range of coordinate values Zs1 and Zs2 in the depth direction. More specifically, these values are determined such that ranges too close and too remote from the stereo camera 1 are excluded. The stereo camera 1 measures the distance therefrom by capturing a single point by two lenses. A range close to the camera is captured only by either one of the lenses, which can not ensure accuracy of the coordinate value in the depth direction, so that the Zs1 is determined to exclude this range.

Here, the range which is captured only by either one of the lenses changes with the angle of convergence. Consequently, a method of determining the values Zs1 and Zs2 will be described when the angle of convergence is 0 degree and when the angle of convergence is angle θ which is other than 0.

As clear from the relationships shown in FIG. 30A, where the angle of convergence is 0 degree and optical axes of the lenses 2a and 2b are parallel to each other, the range in which the point is captured only by either one of the lenses may be expressed as (L/2)/tan W, assuming that the baseline length of the stereo camera 1 is L and the photographing field angle (approximate value) is W. Therefore, the value Zs1 is set to a value greater than (L/2)/tan W, i.e., to a value represented by Formula (8) below.

$$Zs1 = (L/2)/\tan W + K \qquad (8)$$

where, K is the range offset value which is a positive value determined according to the specifications and performance of the stereo camera. The range offset value K may be a fixed value or a value calculated based on information of approximate field angle value, baseline length, angle of convergence, and the like.

The boundary value Zs1 is determined by the usage pixel value extraction means 81 by performing the calculation described above in the process of selecting the pixel group. In the calculation described above, values stored in the file header H are used for the baseline length L and photographing field angle W.

Instead of determining the boundary value by the aforementioned calculation, a value (fixed value) that satisfies the condition of Zs1>(L/2)/tan W regardless of the values of baseline length and photographing field angle may be stored in a memory and used. Where the boundary value is determined by the calculation described above, if the fixed value is stored in a memory, processing may be performed using the fixed value when the calculation failed.

The boundary value Zs2 is set by selecting one of several setting values stored in a memory in advance. For example, a table that associates setting values with baseline lengths or photographing field angles is stored in a memory. Then, a value corresponding to the baseline length or the like recorded in the file header is read out and set as the boundary value Zs2.

Next, with reference to FIG. 30B, a method of determining the values Zs1 and Zs2 will be described when the angle of convergence is angle θ which is other than 0. In the example shown in FIG. 30B, it is assumed that the optical axis of the right imaging lens 2a is parallel to Z axis. As illustrated, the angle of convergence θ is represented by an angle formed by the optical axes of the imaging lenses 2a and 2b.

In this case, the near side boundary of an overlapping range captured by the two lenses can be expressed by the following, assuming that the baseline length is L and photographing field angle (approximate value) is W.

$$L \cdot \tan \beta \cdot \tan \gamma / (\tan \beta + \tan \gamma)$$

(where, β=90°−θ+W, γ=90°−W)
Therefore, the boundary value Zs1 is set to a value which is greater than L·tan β·tan γ/(tan β+tan γ), i.e., to a value represented by Formula (9) below.

$$Zs1 = L \cdot \tan \beta \cdot \tan \gamma / (\tan \beta + \tan \gamma) + K1 \qquad (9)$$

where, K1 is the range offset value which is a positive value determined according to the specifications and performance of the stereo camera. The range offset value K1 may be a fixed value or a value calculated based on information of approximate field angle value, baseline length, angle of convergence, and the like.

The remote side boundary of the overlapping range captured by the two lenses can be expressed by $$L \cdot \tan \beta' \cdot \tan \gamma / (\tan \beta' + \tan \gamma)$$

(where, β'=90°−θ+W, γ=90°−W)
Therefore, the boundary value Zs2 is set to a value which is smaller than L·tan β'·tan γ/(tan β'+tan γ), i.e., to a value represented by Formula (10) below.

$$Zs2 = L \cdot \tan \beta' \cdot \tan \gamma / (\tan \beta' + \tan \gamma) - K2 \qquad (10)$$

where, K2 is the range offset value which is a positive value determined according to the specifications and performance of the stereo camera. The range offset value K2 may be a fixed value or a value calculated based on information of approximate field angle value, baseline length, angle of convergence, and the like. The range offset values K1 and K2 may be set to the same value. Preferably, however, appropriate values calculated based on information of approximate field angle value, baseline length, angle of convergence, and the like be set to them respectively.

The boundary values Zs1 and Zs2 are determined by the usage pixel value extraction means 81 by performing the calculations described above in the process of selecting the pixel group. In the calculations described above, values stored in the file header H are used for the baseline length L and photographing field angle W.

Where the boundary values are obtained by calculation, it is preferable that a reference be made first to the angle of convergence information in file header, and if the referenced value is 0 degree, the calculation of Formula (8) be performed, while if the referenced value is other than 0 degree, the calculations of Formulae (9) and (10) be performed.

Where the angle of convergence is fixed to 0 degree, the calculation of Formula (8) may be performed without referring to the information in the file header. This may reduce the processing time.

The boundary values Ys1, Ys2, Zs1, and Zs2 determined by the aforementioned procedures are those identifying a range in which pixel values are trustworthy, so that the use of only the pixel values in the range defined by the boundary values allows calculation accuracy of photographing field angle to be improved.

As described above, in the present embodiment, the user of the stereo camera 1 adjusts the offset value in X-axis direction while observing the positional relationship between the reference mark and specific area mark displayed in a confirmation image. If the value of photographing field angle is accurate, the display position of each mark in the confirmation image is also accurate, so that the offset may be set to an accurate value. This may reliably eliminate displacement problem at the time of image synthesis.

[Overview of Display Control Unit]

Hereinafter, a display control unit that reproduces and displays a stereoscopic image by receiving an image file outputted from the stereo camera 1 will be described. The display control unit has capabilities to form and display a stereoscopic image from a plurality of image files, as well as displaying a stereoscopic image by referring to one image file.

Figure 33:
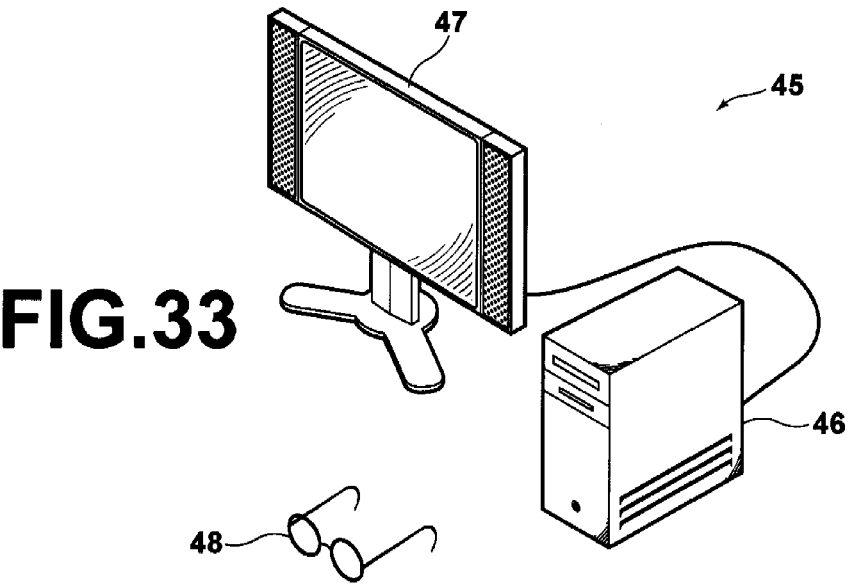
FIG. 33 illustrates an overview of a stereoscopic image display system.

FIG. 33 illustrates an overview of a stereoscopic image display system. As illustrated, the stereoscopic image display system 45 includes a display control unit 46, a stereoscopic display monitor 47, and a pair of polarization glasses 48. When a pair of parallax images for right and left eyes is supplied from the display control unit 46, the stereoscopic display monitor 47 changes the polarization direction between the parallax images for right and left eyes, and outputs the images simultaneously to one screen. The pair of polarization glasses 48 has a pair of polarization filters instead of glasses, and polarization directions of the filters correspond to the polarization directions polarized by the stereoscopic display monitor 47. When the stereoscopic display monitor 47 is observed by an observer wearing the pair of polarization glasses, the image for right eye is recognized only by the right eye, and the image for left eye is recognized only by the left eye.

In addition to the example shown in FIG. 33, naked eye type stereoscopic display methods that do not use a pair of polarization glasses are also known. As typical methods, lenticular method, parallax barrier method, slit light source method, DFD (Depth Fused 3-D), and the like are known. Further, a method capable of reproducing a light beam angle from a subject which is comparable to the actual state has recently been known, in which a method of using a stereoscopic display image which is different from the parallax image is proposed. Since these method also use a distance image for display control, so that the method illustrated in FIG. 33 may be replaced with these method.

Figure 34:
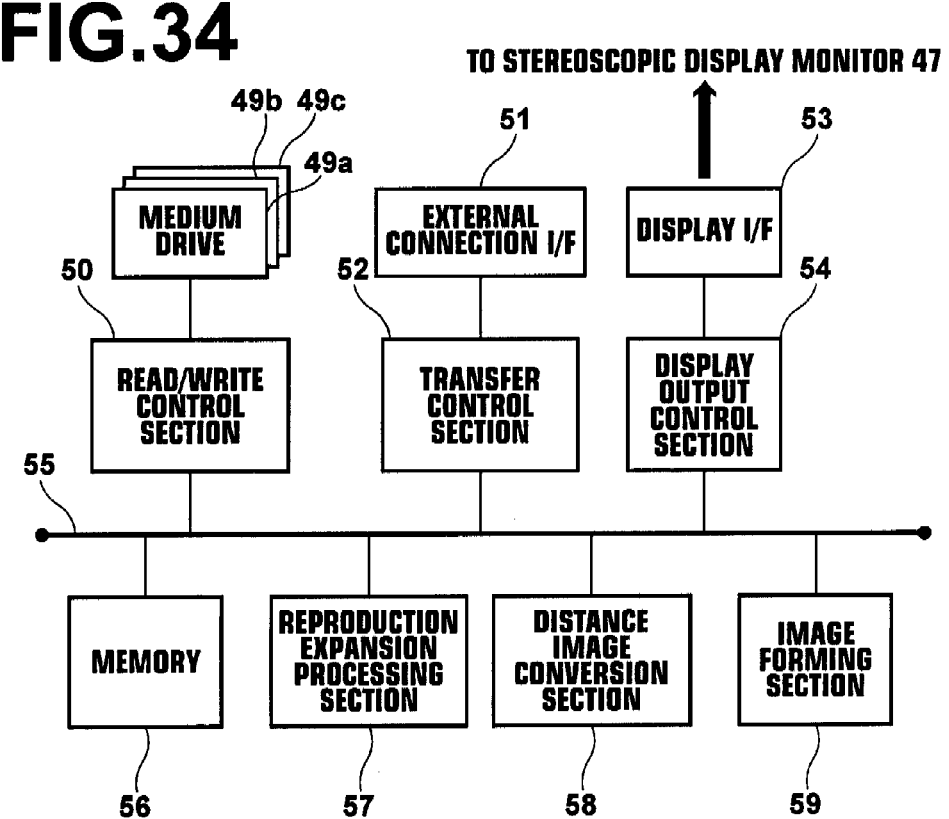
FIG. 34 illustrates an example configuration of a display control unit.

FIG. 34 illustrates a configuration of the display control unit 46. The display control unit 46 includes: medium drives 49a to 49c for a plurality of recording media, such as DVD (Digital Versatile Disk), memory card, and the like; a read/write control section 50 for controlling a reading operation of an image file from a recording medium set in one of the medium drives 49a to 49c and a writing operation of an image file to the medium; an external connection interface 51 for connecting a cable; a transfer control section 52 for controlling a image file transfer via the external connection interface 51; a memory 56 for storing an obtained image file and other data in processing; a display interface 53 for connecting to the stereoscopic monitor 47; and a display output control section 54 for controlling display output via the display interface 53. The read/write control section 50, transfer control section 52, display output control section 54, and memory 56 are connected via a system bus 55.

The system bus 55 further connects a reproduction expansion processing section 57, a distance image conversion section 58, and image forming section 59. The reproduction expansion processing section 57 obtains compressed YCC data from an image file obtained by the read/write control section 50 or the transfer control section 52 and stored in the memory 56. Then, it expands the YCC data so as to become the state prior to compression, and further performs an YCC-RGB conversion and stores a pair of parallax images obtained by the conversion in the memory 56 again.

Figure 35:
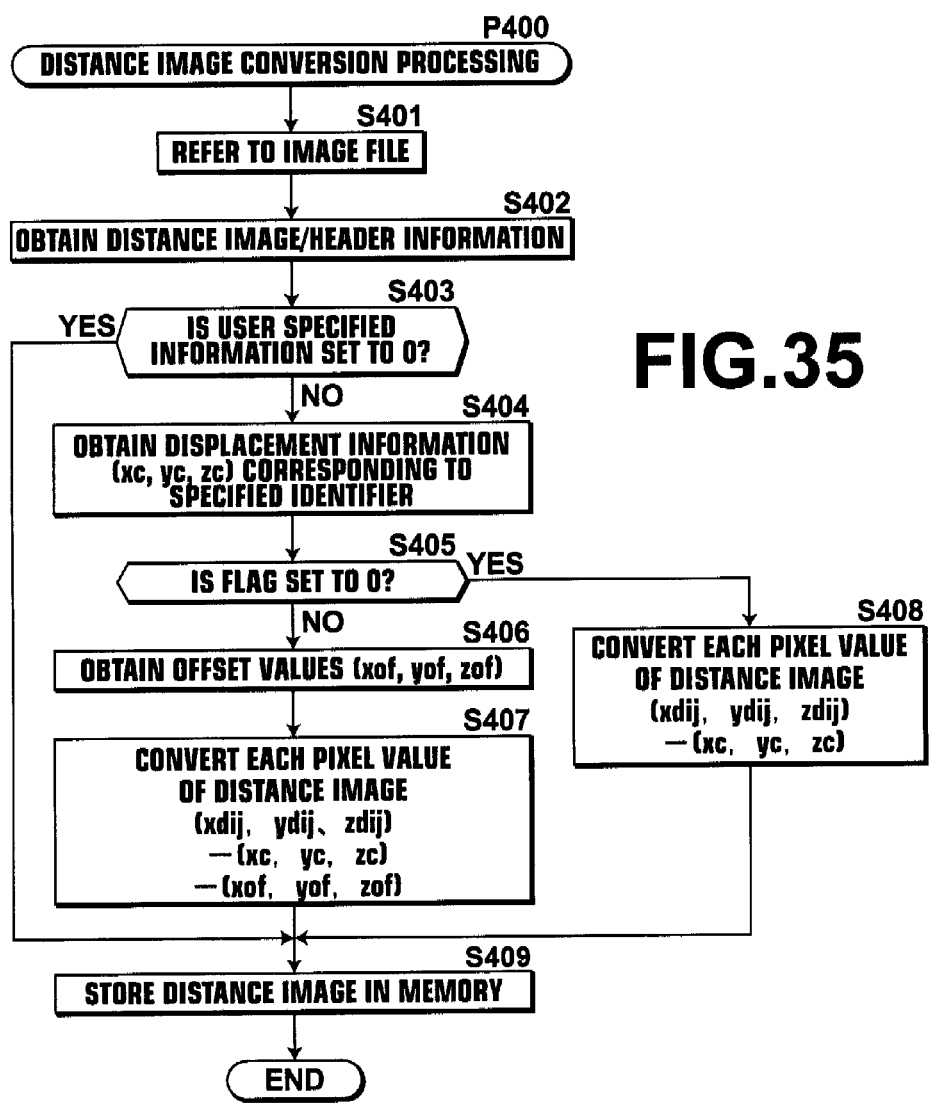
FIG. 35 is a flowchart illustrating example processing of a distance image conversion section.

The distance image conversion section 58 performs processing P400 represented by the flowchart shown in FIG. 35. The distance image conversion section 58 refers to an image file in the memory to confirm whether or not the header of the file has the structure having the areas h1 to h10 shown in FIG. 9A or 9B (S401). If the image file is a file having a different structure, then processing steps that follows are not performed. If the image file is a file having a header including the areas h1 to h10, a distance image D and information stored in the areas h1 to h10 are obtained (S402).

Then, the distance image conversion section 58 determines whether or not a universal coordinate system is specified by the user by determining whether or not the value stored in the area h9 of the file header H is set to "0" (S403). If the value set in the area h9 is an identifier other than "0", the distance image conversion section 58 obtains displacement information associated with the identifier from the area h9 of the file header H (S404). Here, coordinate values obtained as the displacement information will be expressed as (xc, yc, zc).

Then, the distance image conversion section 58 determines whether or not an offset origin is specified by the user by determining whether or not the value of the flag recorded in the area h10 is "0" (S405). If an offset origin is specified, offset values (xof, yof, zof) (S406) are obtained. Thereafter, the distance image conversion section 58 converts a distance image represented by the inherent coordinate system to a distance image represented by the universal coordinate system specified by the user in the following steps.

Where offset origin is not specified, the coordinate values (xc, yc, zc) are subtracted from values (xdij, ydij, zdij) of each pixel (i, j) forming the distance image (S407). Here, note that i and j indicate the position of the pixel in vertical and horizontal directions. In the mean time, where an offset origin is set, coordinate values (xc, yc, zc) indicated by the displacement information are subtracted from the values (xdij, ydij, zdij) of each pixel (i, j) forming the distance image, then the offset values (xof, yof, zof) are further subtracted therefrom (S408). Steps S407 and S408 are performed respectively with respect to all of the pixels forming the distance image.

The distance image after conversion is stored in the memory 56 again (S409). If the value of the user specified information is "0" in step S403, conversion of the distance image is not performed, and the distance image obtained in step S402 is directly stored in the memory 56 (S409).

Figure 36:
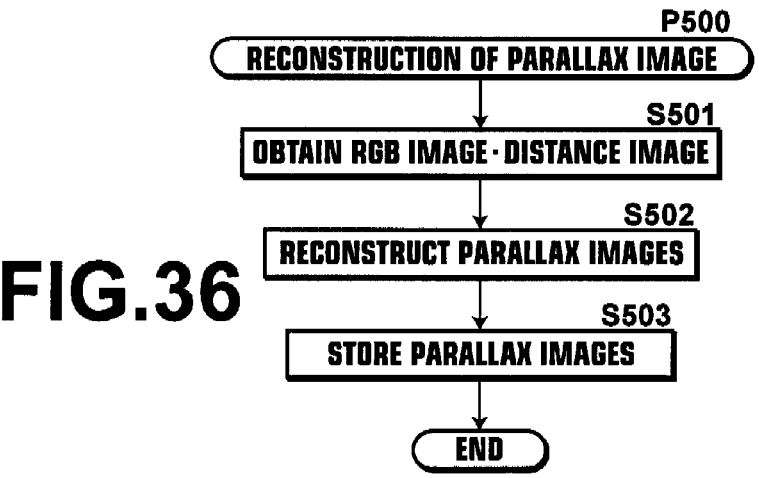
FIG. 36 is a flowchart illustrating example processing of an image forming section.

FIG. 36 is a flowchart illustrating processing of the image forming section 59. The image forming section 59 obtains the image (RGB data) stored by the reproduction expansion section 57 and the converted distance image stored by the distance image conversion section 58 (S501). Then, it reconstructs parallax images for right and left eyes using the obtained image (RGB data) and converted distance image (S502). The reconstructed parallax images are stored in the memory 56 (S503). The display output control section 54 outputs the parallax images stored in the memory 56 at this point in time to the stereoscopic monitor.

[Synthetic image Generation and Display]

Figure 37:
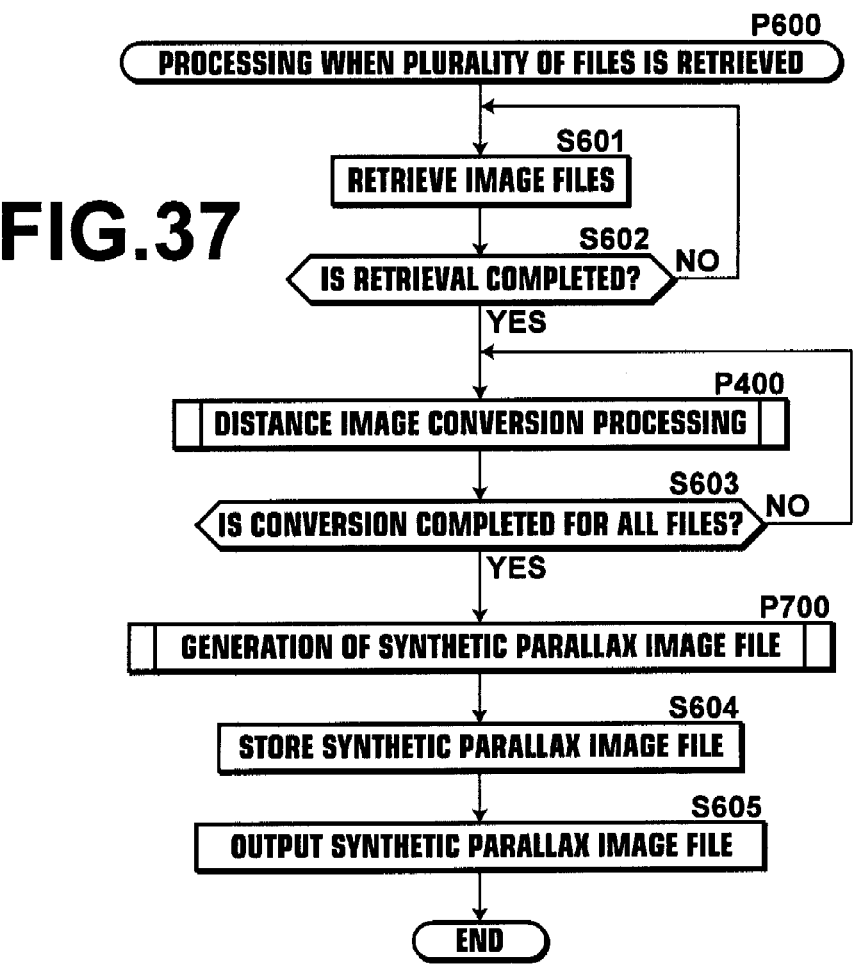
FIG. 37 is a flowchart illustrating an example display control process when a plurality of image files is fetched.

The above description is for display control processing with respect to a single image file. Next, display control processing when a plurality of image files is retrieved will be described with reference to FIG. 37. When a continuous image file retrieval operation is performed by the user from a not shown operation section, either the read/write control section or transfer control section, or both retrieve image files in response to the user operation, until input indicating the end of the file retrieval is received from the user (S601, S602). All of the image files retrieved by the operation are stored in the memory 56. The distance image conversion section 58 repeatedly performs the distance image conversion processing P400 described with reference to FIG. 35 with respect to all of the image files stored in the memory 56 (S603).

The image forming section 59 performs synthetic parallax image file generation processing (P700) with respect to a plurality of image files stored in the memory 56, and stores the generated synthetic parallax image file in the memory 56 (S604). The synthetic parallax image file stored in the memory 56 is read out by the display control section 54 and outputted to the stereoscopic monitor 46 (S605). The synthetic parallax image file stored in the memory 56 may also be stored in a recording medium, such as a memory card via the read/write control section 50 or transferred to another device via the transfer control section 52 (S605).

Hereinafter, the synthetic parallax image file generation processing (P700) will be further described by illustrating a case in which a synthetic parallax image file is generated from two image files. FIG. 38 illustrates the relationships among the camera, photography space, and universal coordinate system when a first synthesis target image file (main image file) is obtained. As illustrated, it is assumed that the main image file is obtained by photographing a photography space in which objects 61, 63, and 64 are disposed using the stereo camera 1 with a relatively wide field angle. FIG. 39 illustrates an example display when the parallax images obtained by the photographing are outputted to the monitor.

Figure 40:
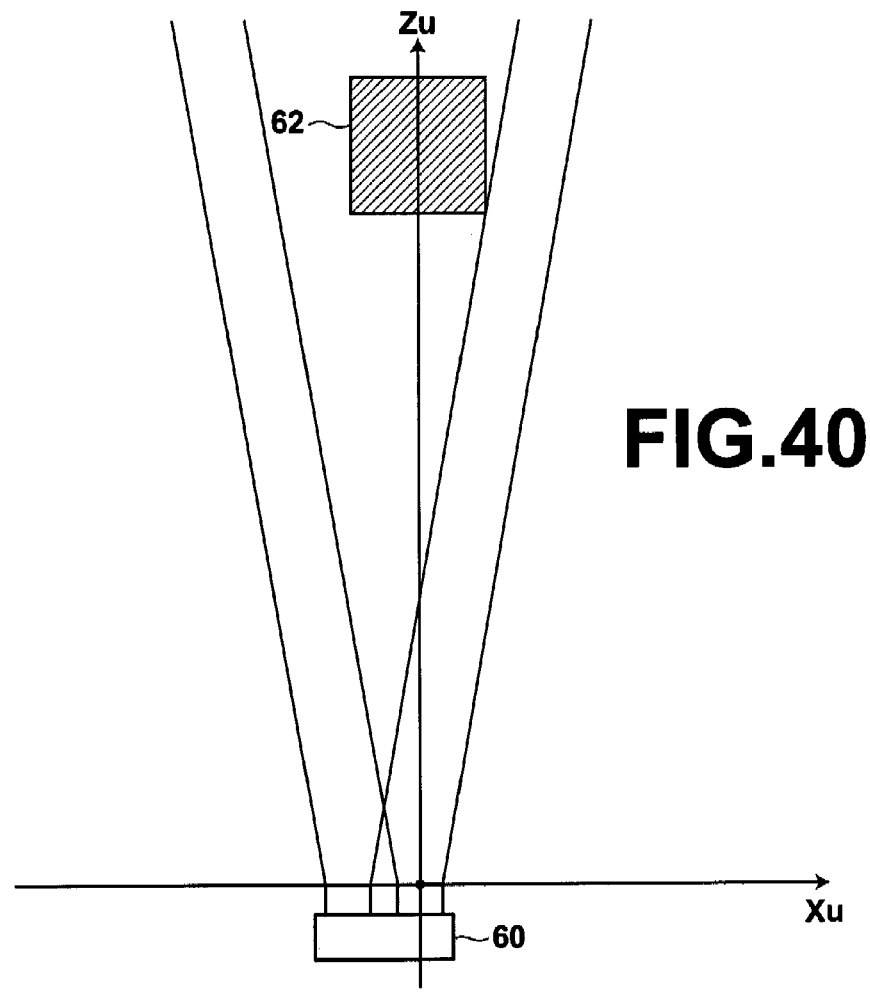
FIG. 40 illustrates an example of relationship among camera, photography space, and universal coordinate system when a sub-image is obtained.
Figure 41:
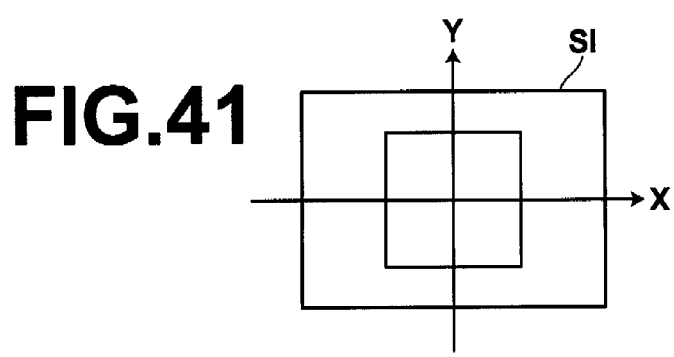
FIG. 41 illustrates an example display where only a sub-image is displayed.

FIG. 40 illustrates the relationships among the camera, photography space, and universal coordinate system when a second synthesis target image file (sub-image file) is obtained. As illustrated, it is assumed that the sub-image file is obtained by photographing a photography space in which an object 62 is disposed using a stereo camera 60 with a narrower field angle than that of the photographing performed by the stereo camera 1. The stereo camera 60 is a camera that outputs an image file having the format described with reference to FIGS. 8, 9A, and 9B, like the stereo camera 1. FIG. 41 illustrates an example display when the parallax images obtained by the photographing are outputted to the monitor.

Figure 42:
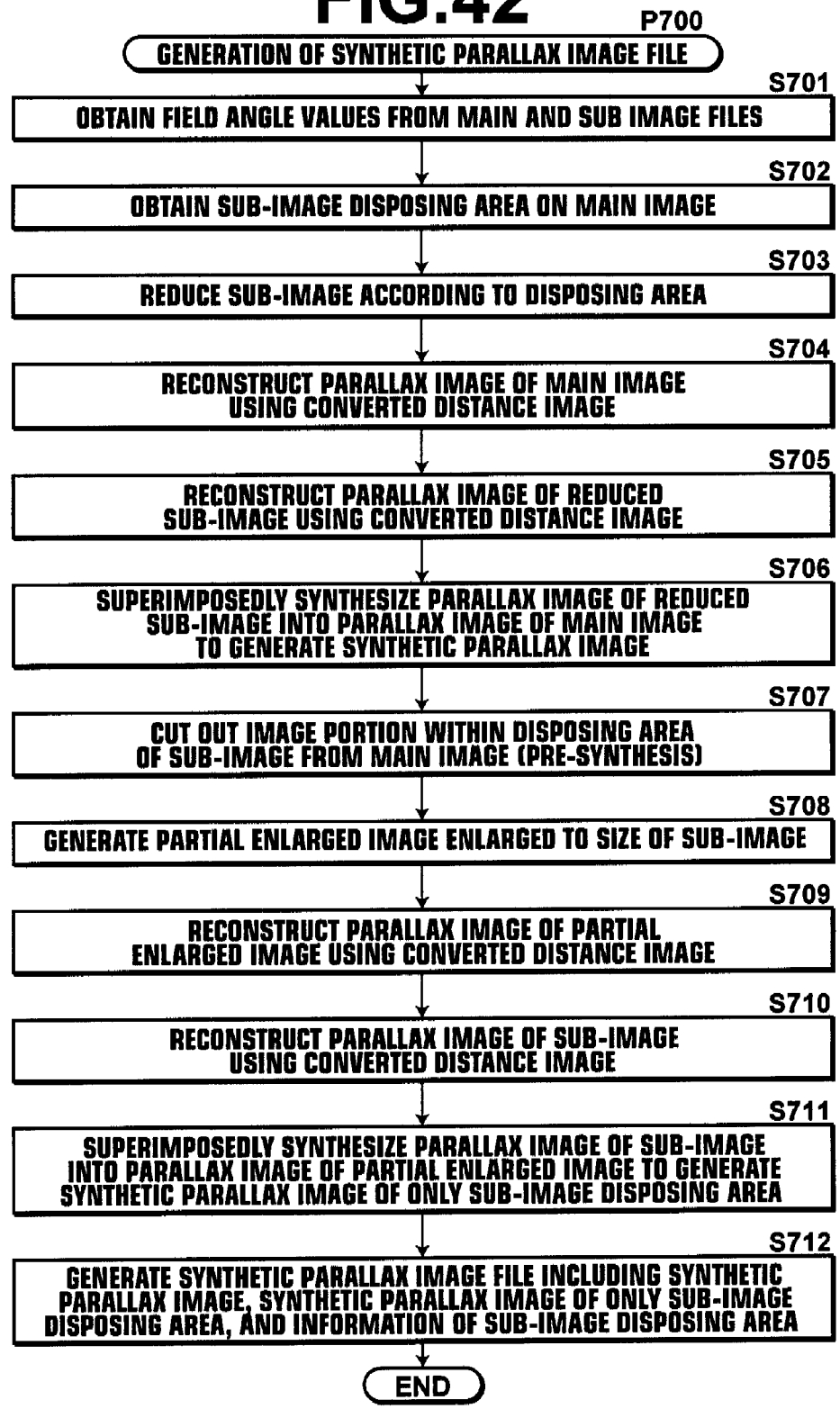
FIG. 42 is a flowchart illustrating an example of synthetic parallax image file generation process.

FIG. 42 is a flowchart illustrating the synthetic parallax image file generation processing P700. The image forming section 59 obtains a field angle $\alpha h$ in the horizontal direction and a field angle $\alpha v$ in the vertical direction from the main image file, and further obtains a field angle $\beta h$ in the horizontal direction and a field angle $\beta v$ in the vertical direction from the sub-image file (S701).

Figure 43:
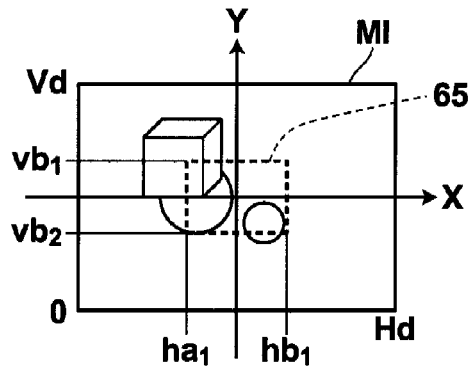
FIG. 43 is a drawing for explaining a sub-image disposing area.

Next, the image forming section 59 obtains a disposing area of a sub-image SI on a main image MI when performing image synthesis by Formula (11) below using the obtained field angles (S702). In Formula (11), Hd represents a number of horizontal display pixels of the main image and Vd represents a number of vertical display pixels of the main image. The disposing area of the sub-image is obtained as a disposing range ha1 to hb1 in the horizontal direction of the sub-image and a disposing range va1 to vb1 in the vertical direction thereof when the bottom left corner of the main image is represented as (0, 0) and the upper right corner thereof is represented as (Hd, Vd). The relationships among Hd, Vd, ha1, hb1, va1, vb1, and a disposing area 65 defined thereby are illustrated in FIG. 43.

$$ha1 = (Hd/2) - (Hd/2) \times (\arctan \beta h / \arctan \alpha h)$$

$$hb1 = (Hd/2) + (Hd/2) \times (\arctan \beta h / \arctan \alpha h)$$

$$va1 = (Vd/2) - (Vd/2) \times (\arctan \beta v / \arctan \alpha v)$$

$$vb1 = (Vd/2) + (Vd/2) \times (\arctan \beta v / \arctan \alpha v) \quad (11)$$

The image forming section 59 reduces the parallax image in the sub-image file according to the disposing area 65 obtained in step S702 (S703). Then, it reconstructs a parallax image of the main image using the converted distance image (S704). For the sub-image, image reconstruction is also performed using the converted distance image, but the image reconstruction is performed on the image reduced in step S703, not on the image recorded in the sub-image file (S705). Then, the parallax image of reduced sub-image formed in step S703 is superimposedly synthezided into the parallax image of the main image reconstructed in step S704 to generate a synthetic parallax image (S706). FIG. 43 illustrates an example display when the synthetic parallax image generated by the processing described above is outputted to the monitor.

The generation of the synthetic parallax image is completed by the processing described above. But, it is assumed here that the image forming section 59 further generates an enlarged synthetic parallax image with respect only to the disposing area 65. Hereinafter, generation of the enlarged synthetic parallax image will be described.

Figure 45:
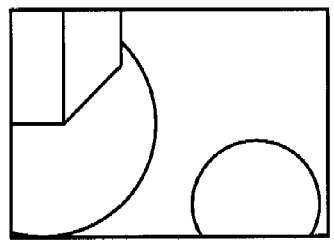
FIG. 45 illustrates an example display of partially enlarged main image.

The image forming section 59 cuts out an image portion corresponding to the disposing area of the sub-image from the parallax image in the main image file, i.e., the pre-synthesis parallax image (S707). Hereinafter, the cut-out parallax image is referred to as "partial image". Then, it enlarges the cut-out partial image to a size corresponding to that of the pre-reduced sub-image (S708). Hereinafter, the enlarged parallax image is referred to as "partial enlarged image". Then, the image forming section 59 reconstructs a parallax image of partial enlarged image using the converted distance image (S709). FIG. 45 illustrates an example display when the parallax image of reconstructed partial enlarged image is outputted to the monitor.

Figure 46:
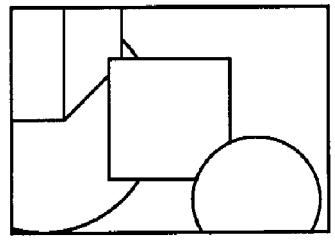
FIG. 46 illustrates an example display of synthetic image of only sub-image.

For the sub-image, a parallax image is also reconstructed using the converted distance image (S710). Then, the parallax image of sub-image reconstructed in step S710 is superimposedly synthesized into the parallax image of partial enlarged image reconstructed in step S609. This generates a synthetic parallax image of only the disposing area 65 of the sub-image (S711). FIG. 46 illustrates an example display when the synthetic parallax image of only the disposing area 65 of the sub-image is outputted to the monitor. Then, the image forming section 59 generates a synthetic parallax image file that includes the synthetic parallax image generated in step S706, synthetic parallax image of only the sub-image disposing area generated in step S711, and information of the disposing area obtained in step S702 (S712).

Where synthesis processing with respect to three or more image files is performed, it is desirable that an image having the widest filed angle is selected as the main image based on the field angle information obtained in step S701 with others selected as the sub-images and steps following the step S701 are performed. In this case, steps related to sub-image are performed with respect to each sub-image. Alternatively, if the synthesis is performed with a sub-image having a wider field angle than that of the main image, it is conceivable that the synthesis is performed after a portion of the sub-image exceeding the field angle of the main image is eliminated.

Figure 44:
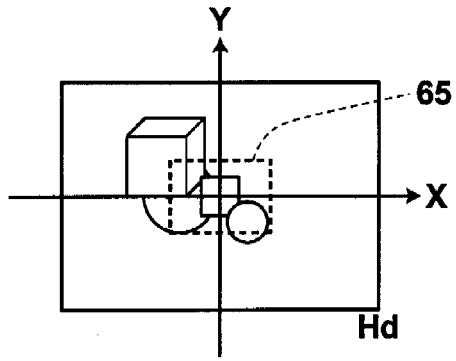
FIG. 44 illustrates an example display of synthetic parallax image.
Figure 47:
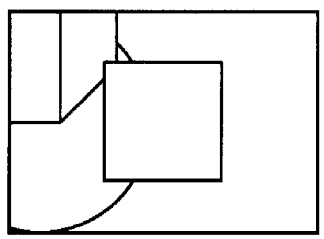
FIG. 47 illustrates an example of special display of synthetic image with only a sub-image disposing area.

In the aforementioned example, a priority is given to accurately reproduce positional relationship between the objects, and the synthetic parallax images shown in FIGS. 44 and 46 faithfully represent the converted distance image. In contrast, another type of representation which gives priority to viewability over accuracy is also conceivable. For example, when a user wants to attentively observe the sub-image, the user will request display of the synthetic parallax image of FIG. 46. Thus, when display of the synthetic parallax image of FIG. 46 is request, a priority may be given to the viewability of the sub-image over accuracy of positional relationship. When generating a synthetic parallax image file based on such idea, it is preferable to provide a special representation shown in FIG. 47 instead of the representation shown in FIG. 46. That is, if an object is present in the main image at a position which blocks an object included in the sub-image, the obstructing object is eliminated from the representation.

When implementing the special representation, a determination is made as to whether or not information of the position coordinates (xa, ya, za) of the specific area A is stored in the sub-image file before reconstructing the parallax image of partial enlarged image in step S709. If the information of the position coordinates of the specific area A is included in the sub-image file, the value of depth direction za is obtained. If the information of the position coordinates of the specific area A is not included in the sub-image file, the center point or the like of one of the objects within the sub-image located at the forefront is regarded as the specific area based on the distance image of the sub-image, and the position coordinate value in depth direction za thereof is obtained from the distance image of the sub-image.

Figure 48:
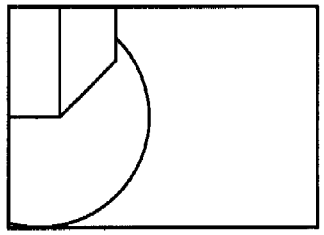
FIG. 48 illustrates an example correction of a partially enlarged image for special display.

Then, a pixel having a value not greater than za as the coordinate value in depth direction is searched for from the distance image of the main image, and the value of the pixel is replaced with a value that indicates infinite distance. This causes the area where the replacement took place not to include any object, so that the parallax image of the partial enlarged image reconstructed in step S709 becomes like that shown in FIG. 48. That is, the object located in a position blocking an object included in the sub-image is hidden. The steps that follow are identical to steps S710, S711, and S712 described above.

A format of synthetic parallax image file will now be described. As illustrated in FIG. 49, the synthetic parallax image file includes a file header H', an entire synthetic parallax image generated in step S706, and a synthetic parallax image of only the disposing area of the sub-image generated in step S711. Where a plurality of sub-images is present, a plurality of synthetic parallax images of only the disposing area of the sub-images is recorded in the file.

Figure 50:
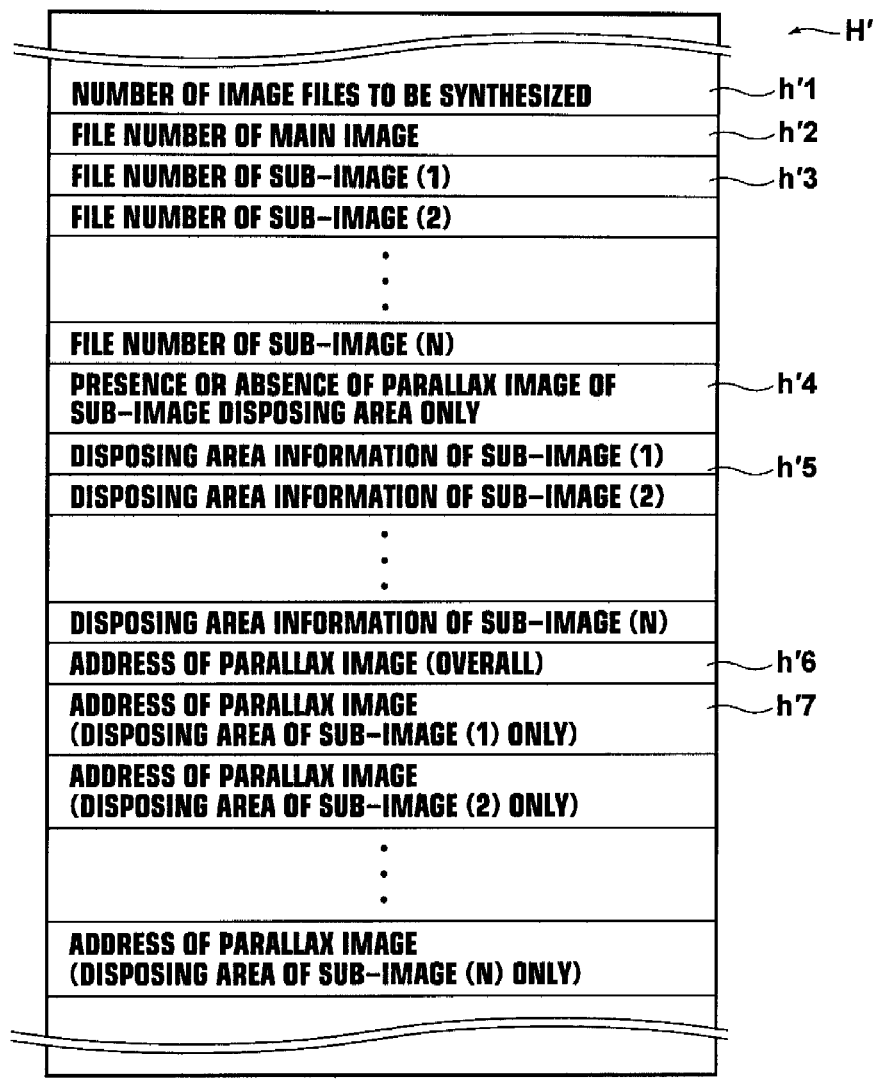
FIG. 50 illustrates a portion of the header of a synthetic parallax image file.

As illustrated in FIG. 50, the file header H' includes: an area h'1 for storing the number of image files to be synthesized; an area h'2 for storing the file number of the main image file in the memory; an area h'3 for storing the file number of a sub-image file; an area h'4 for storing data that indicate presence of absence of a synthetic parallax image of only the sub-image disposing area; an area h'5 for storing sub-image disposing area information; an area h'6 for storing the address of a synthetic parallax image; and an area h'7 for storing the address of a synthetic parallax image of only the disposing area of the sub-image. In addition to the above, an area for storing information linking to an original image file used for the synthesis may further be provided.

A numerical value that indicates the number of files is set in the area h'1. The file number set in the area h'2 or h'3 is an identifier that specifies the file and may be a symbol including an alphabet. A value of "1" is set to the area h'4 if a synthetic parallax image of only the sub-image disposing area is included in the file, and if not a value of "0" is set. If steps S707 to S711 in the flowchart shown in FIG. 42 are omitted, a value of "0" is set in the area h'4. The values ha1, hb1, va1 and vb1 obtained in step S702 are stored in the area h'5. Addresses that indicate the positions of the respective synthetic parallax images are stored in the areas h'6 and h'7 respectively. Here, the address as used herein means, for example, an offset from the top of the file shown in FIG. 49 to each synthetic parallax image.

As described above, the image forming section 59 performs an image synthesis using a distance image converted by the distance image conversion section 58. That is, it performs an image synthesis on the universal coordinate system. Thus, if the same coordinate system is specified in the file headers of main and sub-image files, the problem of the conventional methods does not occur, and the results of synthesis are the same regardless of whether each of the image files to be synthesized is generated by the same device or different devices. In particular, for complicated synthesis involving enlargement or reduction, as in the example described above, stable results can not be obtained by the conventional methods in which positional displacement occurs due to the use of different coordinate systems. According to the method described above, various types of image processing may be performed without regarding misalignment of coordinate systems, so that stable results may always be obtained even when synthesis processing which is more complicated than that of the aforementioned example is performed.

Further, the image forming section 59 does not perform synthesis processing for every display time, but consolidates and stores a synthetic parallax image and information obtained in the synthesis process in one image file. Where the same synthetic parallax image needs to be displayed at a later time, it is only necessary to reproduce the synthetic parallax image included in the file on the monitor, which may reduce the processing time significantly. Further, storage as a synthetic parallax image file allows synthesis processing and display processing to be shared by different devices. Enabling the synthesis processing to be performed by a different device allows the circuitry of display control unit to be simplified, which leads to downsizing and low cost of the display control unit.

[Modification]

Further, in the embodiment described above, the photographing field angle calculation unit is implemented as one of the components of the confirmation image generation section 67 of the stereo camera 1, but the photographing field angle calculation unit according to the present invention may be incorporated in any processing section which requires a value of photographing field angle. Still further, implementation as an independent section or a unit allows the photographing field angle calculation unit to be used widely in various types of image processing.

Still further, the photographing field angle calculation unit of the present invention is applicable not only to an apparatus that generates a distance image but also to an apparatus that uses a distance image generated by another apparatus. For example, the photographing field angle calculation unit may be incorporated in an apparatus like the display control unit described above, i.e., a stereoscopic image editing apparatus that performs editing processing for a stereoscopic image using a value of photographing field angle, or a reproduction apparatus that reproduces a stereoscopic image for display using a value of photographing field angle. The reproduction apparatus may be a processing apparatus having a reproduction function (personal computer or the like) or a processing apparatus integrated with a display apparatus. Increased accuracy of a value used in calculation allows displacement or distortion of an image to be edited or reproducibly displayed may be reduced. In addition to those described above, the present invention is applicable to any apparatus that requires an accurate value of photographing field angle in the processing process.

What is claimed is:

1. A photographing field angle calculation apparatus, comprising:
   a memory for storing the position of each point captured by an imaging system as a set of horizontal, vertical, and depth coordinate values when a photography space is photographed by the imaging system;
   a usage pixel value extraction means for selecting a plurality of points located in end portions of a range captured by the imaging system from those stored in the memory based on the vertical coordinate value and/or horizontal coordinate value, and extracting the horizontal coordinate value and/or vertical coordinate value, and the depth coordinate value of each of the selected points; and
   a field angle calculation means for calculating a horizontal photographing field angle using the horizontal and depth coordinate values extracted from the memory by the usage pixel value extraction means and/or calculating a vertical photographing field angle using the vertical and depth coordinate values extracted from the memory by the usage pixel value extraction means.

2. The photographing field angle calculation apparatus according to claim 1, wherein the usage pixel value extraction means selects a point located in a vertical center portion of each end portion in the horizontal direction from those located in each end portion in the horizontal direction based on vertical position information of the points and/or selects a point located in a horizontal center portion of each end portion in the vertical direction from those located in each end portion in the vertical direction based on horizontal position information of the points, and extracts the coordinate values with respect to the selected points.

3. The photographing field angle calculation apparatus according to claim 1, wherein when the imaging system is a system that obtains a luminance image by one optical system and obtains the coordinate values by two optical systems including the one optical system,
   the usage pixel value extraction means estimates an overlapping range captured by the two optical systems based on the positional relationship between the one optical system and the other optical system, and performs the selection of a plurality of points only at end portions included in the range.

4. The photographing field angle calculation apparatus according to claim 1, wherein the usage pixel value extraction means sets a predetermined range in the depth direction for depth coordinate values, and performs the extraction of coordinate values with respect to points within the set range.

5. The photographing field angle calculation apparatus according to claim 4, wherein the usage pixel value extraction means sets the range based on a baseline length and approximate values of field angles of two optical systems constituting the imaging system.

6. The photographing field angle calculation apparatus according to claim 4, wherein the usage pixel value extraction means sets the range based on a baseline length, approximate values of field angles, and an angle of convergence of two optical systems constituting the imaging system.

7. The photographing field angle calculation apparatus according to claim 4, wherein the usage pixel value extraction means sets the range in the depth direction to a range obtained by adding a predetermined range offset value to an overlapping range captured by two optical systems constituting the imaging system.

8. The photographing field angle calculation apparatus according to claim 7, wherein the range offset value is determined with respect to each boundary of the range.

9. The photographing field angle calculation apparatus according to claim 1, wherein the field angle calculation means is a means that calculates the photographing field angle by performing calculations on pixel values extracted from the memory by the usage pixel value extraction means based on a formula below, $$\alpha = \arctan(\Sigma(xi/zi)/n)$$

where:
   $\alpha$ is the photographing field angle; n is the number of selected pixels; i ranges from 1 to n; xi is a pixel value indicating the position of the pixel selected by $i^{th}$ selection in the horizontal or vertical direction; and zi is a pixel value indicating the position of the pixel selected by $i^{th}$ selection in the depth direction.

10. The photographing field angle calculation apparatus according to claim 1, wherein the field angle calculation means records a calculated value of the photographing field angle in a predetermined memory.

11. The photographing field angle calculation apparatus according to claim 1, wherein the field angle calculation means records a calculated value of the photographing field angle in a file in which the set of coordinate values are recorded.

12. The photographing field angle calculation apparatus according to claim 11, wherein the field angle calculation means records the calculated value of the photographing field angle in an area of the file different from an area in which an approximate value of the field angle is recorded.

13. A stereoscopic image editing apparatus, comprising:
   a memory for storing the position of each point captured by an imaging system as a set of horizontal, vertical, and depth coordinate values when a photography space is photographed by the imaging system;
   a usage pixel value extraction means for selecting a plurality of points located in end portions of a range captured by the imaging system from those stored in the memory based on the vertical coordinate value and/or horizontal coordinate value, and extracting the horizontal coordinate value and/or vertical coordinate value, and the depth coordinate value of each of the selected points;
   a field angle calculation means for calculating a horizontal photographing field angle using the horizontal and depth coordinate values extracted from the memory by the usage pixel value extraction means and/or calculating a vertical photographing field angle using the vertical and depth coordinate values extracted from the memory by the usage pixel value extraction means; and an editing means for editing a stereoscopic image using the value of the photographing field angle calculated by the field angle calculation means.

14. A stereoscopic image reproduction apparatus, comprising:
- a memory for storing the position of each point captured by an imaging system as a set of horizontal, vertical, and depth coordinate values when a photography space is photographed by the imaging system;
- a usage pixel value extraction means for selecting a plurality of points located in end portions of a range captured by the imaging system from those stored in the memory based on the vertical coordinate value and/or horizontal coordinate value, and extracting the horizontal coordinate value and/or vertical coordinate value, and the depth coordinate value of each of the selected points;
- a field angle calculation means for calculating a horizontal photographing field angle using the horizontal and depth coordinate values extracted from the memory by the usage pixel value extraction means and/or calculating a vertical photographing field angle using the vertical and depth coordinate values extracted from the memory by the usage pixel value extraction means; and
- a reproduction means for reproducing a stereoscopic image for display using the value of the photographing field angle calculated by the field angle calculation means.

* * * * *